(12) United States Patent
Guo et al.

(10) Patent No.: US 12,730,254 B2
(45) Date of Patent: Sep. 8, 2026

(54) HIGH CHROMA STRUCTURAL COLOR ASSEMBLY FOR VIVID COLOR GENERATION

(71) Applicant: THE REGENTS OF THE UNIVERSITY OF MICHIGAN, Ann Arbor, MI (US)

(72) Inventors: Lingjie Jay Guo, Ann Arbor, MI (US); Weijie Feng, Seattle, WA (US)

(73) Assignee: The Regents of The University of Michigan, Ann Arbor, MI (US)

( * ) Notice: Subject to any disclaimer, the term of this patent is extended or adjusted under 35 U.S.C. 154(b) by 245 days.

(21) Appl. No.: 18/744,070

(22) Filed: Jun. 14, 2024

(65) Prior Publication Data

US 2024/0418917 A1 Dec. 19, 2024

Related U.S. Application Data

(60) Provisional application No. 63/521,184, filed on Jun. 15, 2023.

(51) Int. Cl.
*G02B 5/28* (2006.01)

(52) U.S. Cl.
CPC .................................... *G02B 5/28* (2013.01)

(58) Field of Classification Search
CPC .................................. G02B 5/28; G02B 5/288
See application file for complete search history.

(56) References Cited

U.S. PATENT DOCUMENTS 9,261,753 B2 2/2016 Guo et al.
2009/0159123 A1* 6/2009 Kothari ................ H10F 10/142 136/256

OTHER PUBLICATIONS

Wei-Jie Feng et al.; "Temporal Coupled Mode Analysis of Chromaticity in Trilayer Subtractive Structural Colors"; ACS Photonics 2023, 10, 2784-2792.

* cited by examiner

*Primary Examiner* — Phu Vu
(74) *Attorney, Agent, or Firm* — Harness, Dickey & Pierce, P.L.C.

(57) ABSTRACT

Structural color devices having high chromaticity and vivid color generation include a resonator cavity with multilayer stack having a first layer comprising a light absorbing material, a second layer comprising a low refractive index layer, and a third layer comprising a high refractive index layer. An ultrathin high refractive index layer may be disposed between the first and second layers in alternative variations. The structural color device has one or more of: (i) a chromaticity "C" of greater than or equal to about 90; (ii) a difference of a decay rate of intrinsic resonator absorption ($\gamma_{abs}$) of the resonator cavity and a decay rate of radiative loss ($\gamma_{rad}$) of the resonator cavity is less than or equal to about 25%; or both (i) and (ii).

17 Claims, 12 Drawing Sheets

Figures 1A, 1B, 1C, 1D, 1E, 1F:
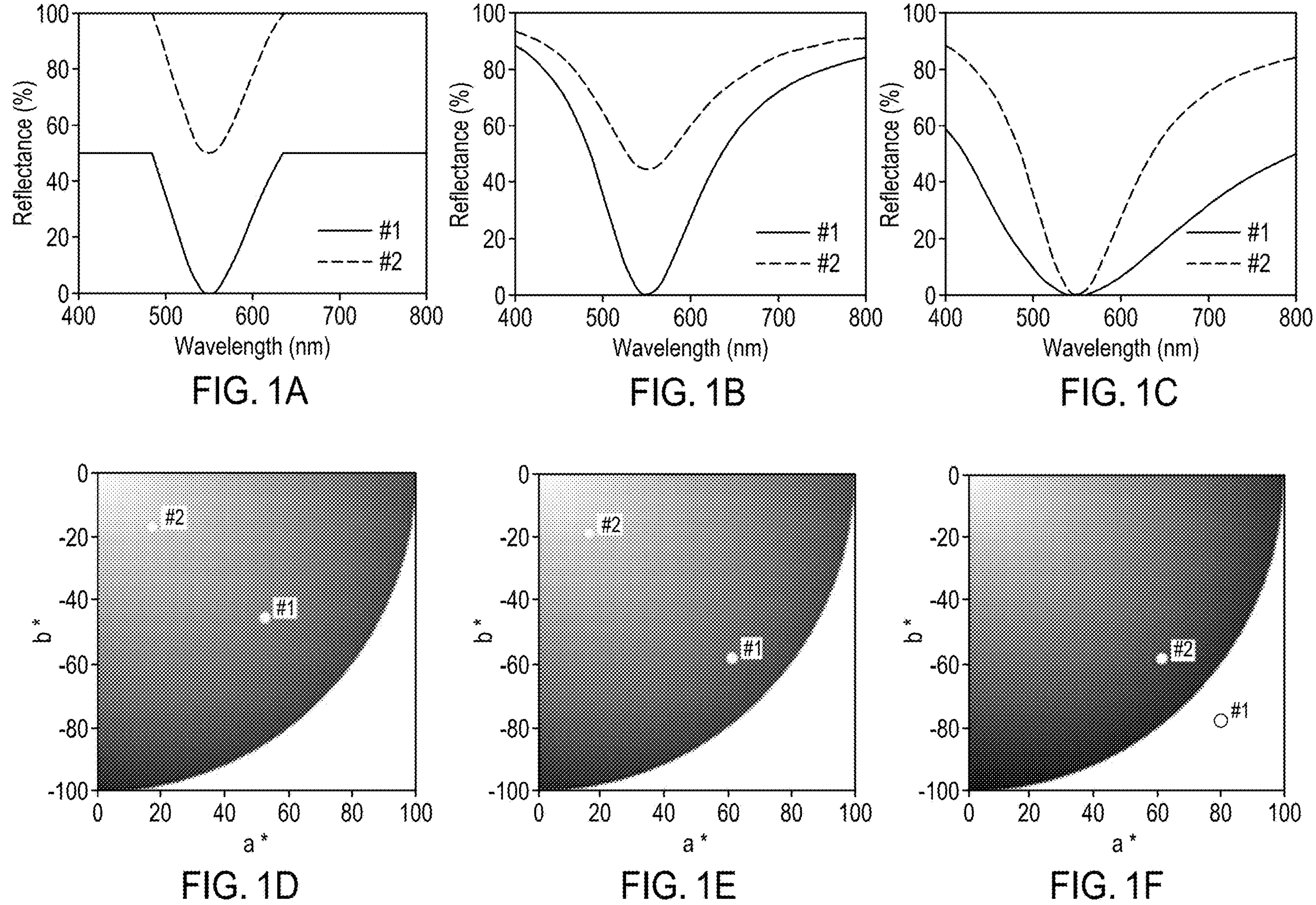

0.6
0.5
0.4
0.3
0.2
0.1
0.0
Cu
Si
Ti
Ge
Pt
Ag
Al
$\gamma_{tot} = \gamma_{abs} + \gamma_{rad}$ (eV)
$10^{-2}$ $10^{-1}$ $10^{0}$ $10^{1}$ $10^{2}$
$\delta = \gamma_{abs} / \gamma_{rad}$
100
90
80
70
60
50
40
30
20
10
0

0.6
0.5
0.4
0.3
0.2
0.1
0.0
$\gamma_{tot} = \gamma_{abs} + \gamma_{rad}$ (eV)
Si
Ti
Ge
Pt
Cu
Al
Ag
$10^{-2}$ $10^{-1}$ $10^{0}$ $10^{1}$ $10^{2}$
$\delta = \gamma_{abs} / \gamma_{rad}$
100
90
80
70
60
50
40
30
20
10
0

Reflectance (%)
Wavelength (nm)
25 nm TiO2
SiO2
24 nm TiO
Ti
1 cm
Ti
24 nm TiO2/Ti
Structure A 25 nm TiO2
SiO2
14 nm Ge
Al
1 cm
Al
14 nm Ge/Al
Structure B

HIGH CHROMA STRUCTURAL COLOR ASSEMBLY FOR VIVID COLOR GENERATION

CROSS-REFERENCE TO RELATED APPLICATIONS

This application claims the benefit of U.S. Provisional Application No. 63/521,184, filed Jun. 15, 2023. The entire disclosure of the above application is incorporated herein by reference.

GOVERNMENT SUPPORT

This invention was made with government support under 2213684 awarded by the National Science Foundation. The government has certain rights in the invention.

FIELD

The present disclosure relates to a structural color assembly of a multilayer stack that defines a resonator cavity having a high chromaticity for vivid color generation.

BACKGROUND

This section provides background information related to the present disclosure which is not necessarily prior art.

Chromaticity or chroma, as one of the three dimensions (lightness, hue, and chroma) for color representation, is a unique parameter for perceiving the degree of color saturation. Recently, structural color designed from stratified layers has proven to be one of the most promising ways to achieve industrial level production due to relatively simple structures, as well as numerous coating methods available. These layered structural color pigments offer advantages such as long-term durability, brilliant coloration, environmental-friendly, and providing special visual effects (e.g., iridescence). However how to systematically tune and enhance/optimize color chromaticity to create vivid and rich colors remains an open problem. Thus, it would be desirable to develop methods of tuning multilayer structures to exhibit maximum chroma or vivid colors and the structural multilayer assemblies exhibiting such highly chromatic color.

SUMMARY

This section provides a general summary of the disclosure, and is not a comprehensive disclosure of its full scope or all of its features.

In certain aspects the present disclosure relates to a structural color device having high chromaticity and vivid color generation. The device may comprise a resonator cavity comprising a multilayer stack. The multilayer stack may comprise a first layer comprising a light absorbing material. A second layer comprises a low refractive index material defining a first side and a second side, wherein the first side faces the first layer. The multilayer stack also comprises a third layer comprising a high refractive index material. The third layer is disposed on the second side of the second layer. The structural color device has one or more of: (i) a chromaticity "C" of greater than or equal to about 90; (ii) a difference of a decay rate of intrinsic resonator absorption ($\gamma_{abs}$) of the resonator cavity and a decay rate of radiative loss ($\gamma_{rad}$) of the resonator cavity is less than or equal to about 25%; or both (i) and (ii).

In certain aspects, the light absorbing material of the first layer is selected from the group consisting of: silicon (Si), germanium (Ge), titanium (Ti), silicon carbide (SiC), gallium nitride (GaN), gallium phosphide (GaP), zinc sulfide (ZnS), zinc selenide (ZnSe), chalcogenides, iron oxides, carbon black, carbon nanotubes (CNTs), colored polymers, and combinations thereof.

In certain aspects, the low refractive index material of the second layer is selected from the group consisting of: silicon dioxide ($SiO_2$), silicon nitride ($Si_3N_4$), zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), zinc selenide (ZnSe), zinc sulfide (ZnS), aluminum oxide ($Al_2O_3$), magnesium fluoride ($MgF_2$), polymers, and combinations thereof.

In certain aspects, the low refractive index material of the second layer has a real part of a refractive index of less than or equal to about 2.

In certain aspects, the high refractive index material of the third layer is selected from the group consisting of: titanium oxide ($TiO_2$), zirconium dioxide ($ZrO_2$), cupric (I) oxide (CuO), hafnium dioxide ($HfO_2$), amorphous silicon (a-Si), germanium (Ge), ferric oxide ($Fe_2O_3$), vanadium pentoxide ($V_2O_5$) zinc oxide (ZnO), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof.

In certain aspects, the high refractive index material of the third layer has a real part of a refractive index of greater than or equal to about 2.

In certain aspects, the first layer, the second layer, and the third layer respectively have a maximum average thickness of less than or equal to about 500 nm.

In certain aspects, the first layer has a maximum average thickness of less than or equal to about 50 nm.

In certain aspects, the second layer comprises silicon dioxide ($SiO_2$) and the third layer comprises titanium dioxide ($TiO_2$).

In certain aspects, the first layer comprises silicon (Si), the second layer comprises silicon dioxide ($SiO_2$) and has a second thickness of about 225 nm, and the third layer comprises titanium dioxide ($TiO_2$) and has a third thickness of about 25 nm and the chromaticity "C" is about 93.4.

In certain aspects, the first layer comprises a first sublayer comprising titanium dioxide ($TiO_2$) having a first thickness of about 24 nm disposed over a second sublayer comprising titanium (Ti), the second layer comprises silicon dioxide ($SiO_2$) and has a second thickness of about 225 nm, and the third layer comprises titanium dioxide ($TiO_2$) and has a third thickness of about 25 nm and the chromaticity "C" is about 95.

In certain aspects, the first layer comprises a first sublayer comprising germanium (Ge) having a first thickness of about 14 nm disposed over a second sublayer comprising aluminum (Al), the second layer comprises silicon dioxide ($SiO_2$) and has a second thickness of about 205 nm, and the third layer comprises titanium dioxide ($TiO_2$) and has a third thickness of about 25 nm and the chromaticity "C" is about 110.2.

In certain aspects, the structural color device further comprises a fourth layer disposed between the first layer and the second layer. The fourth layer has a maximum average thickness of less than or equal to about 30 nm and comprises a high refractive index material.

In certain other aspects, the present disclosure relates to a structural color device having high chromaticity and vivid color generation. The device comprises a resonator cavity comprising a multilayer stack. The multilayer stack includes a first layer comprising a light absorbing material selected from the group consisting of: silicon (Si), germanium (Ge), titanium (Ti), silicon carbide (SiC), gallium nitride (GaN), gallium phosphide (GaP), zinc sulfide (ZnS), zinc selenide (ZnSe), chalcogenides, iron oxides, carbon black, carbon nanotubes (CNTs), colored plastics, and combinations thereof. The multilayer stack also comprises a second layer comprising a low refractive index material selected from the group consisting of: silicon dioxide ($SiO_2$), silicon nitride ($Si_3N_4$), zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), zinc selenide (ZnSe), zinc sulfide (ZnS), aluminum oxide ($Al_2O_3$), magnesium fluoride ($MgF_2$), polymers, and combinations thereof. The second layer defines a first side and a second side, where the first side faces the first layer. The multilayer stack further includes a third layer comprising a high refractive index material selected from the group consisting of: titanium oxide ($TiO_2$), zirconium dioxide ($ZrO_2$), cupric (I) oxide (CuO), hafnium dioxide ($HfO_2$), amorphous silicon (a-Si), germanium (Ge), ferric oxide ($Fe_2O_3$), vanadium pentoxide ($V_2O_5$) zinc oxide (ZnO), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof. The third layer is disposed on the second side of the second layer. The structural color device has one or more of: (i) a chromaticity "C" of greater than or equal to about 90; (ii) a difference of a decay rate of intrinsic resonator absorption ($\gamma_{abs}$) of the resonator cavity and a decay rate of radiative loss ($\gamma_{rad}$) of the resonator cavity is less than or equal to about 25%; or both (i) and (ii).

In certain aspects, the structural color device further comprises a fourth layer disposed between the first layer and the second layer. The fourth layer has a maximum average thickness of less than or equal to about 30 nm and comprises a high refractive index material.

In certain aspects, the first layer, the second layer, and the third layer respectively have a maximum average thickness of less than or equal to about 500 nm.

In certain aspects, the first layer has a maximum average thickness of less than or equal to about 50 nm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1F. FIGS. 1A-1C show three scenarios for a typical tri-layer subtractive color with a dip in the reflection spectra for numbers 1 and 2. FIGS. 1D-1F shows corresponding CIEL*a*b* coordinates for these three scenarios. Points further away from the center represent higher color chroma.

Figures 2A, 2B, 2C, 2D, 2E, 2F:
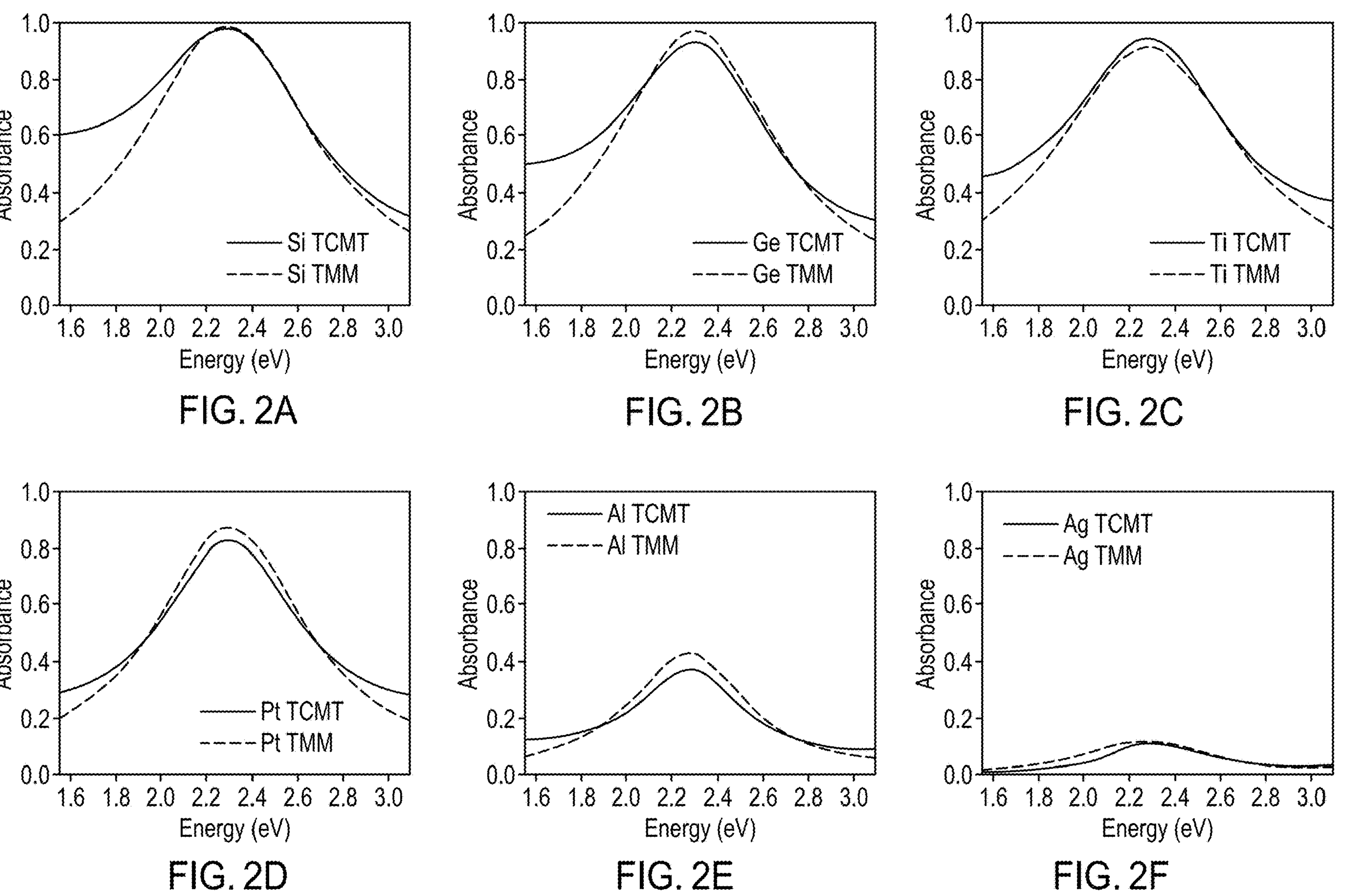

FIGS. 2A-2F show simulated absorption spectra of HLA structures in dark magenta color with various substrate absorbers: FIG. 2A shows silicon (Si). FIG. 2B shows germanium (Ge). FIG. 2C shows titanium (Ti). FIG. 2D shows platinum (Pt). FIG. 2E shows aluminum (Al). FIG. 2F shows silver (Ag). A close match between the two simulation methods TMM (solid line) and TCMT (dash line) in the vicinity of the absorption peak is observed.

Figure 3A:
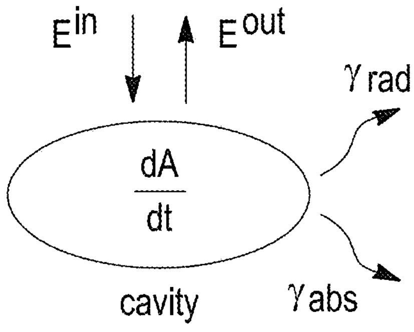
Figure 3B:
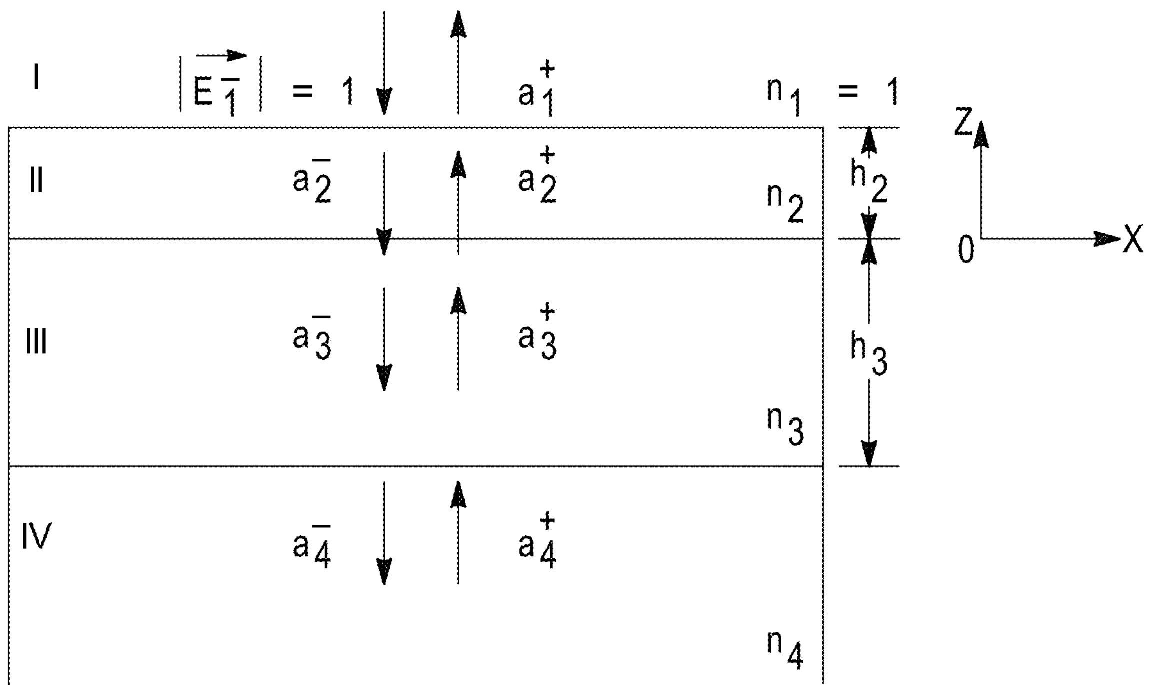
Figure 3C:
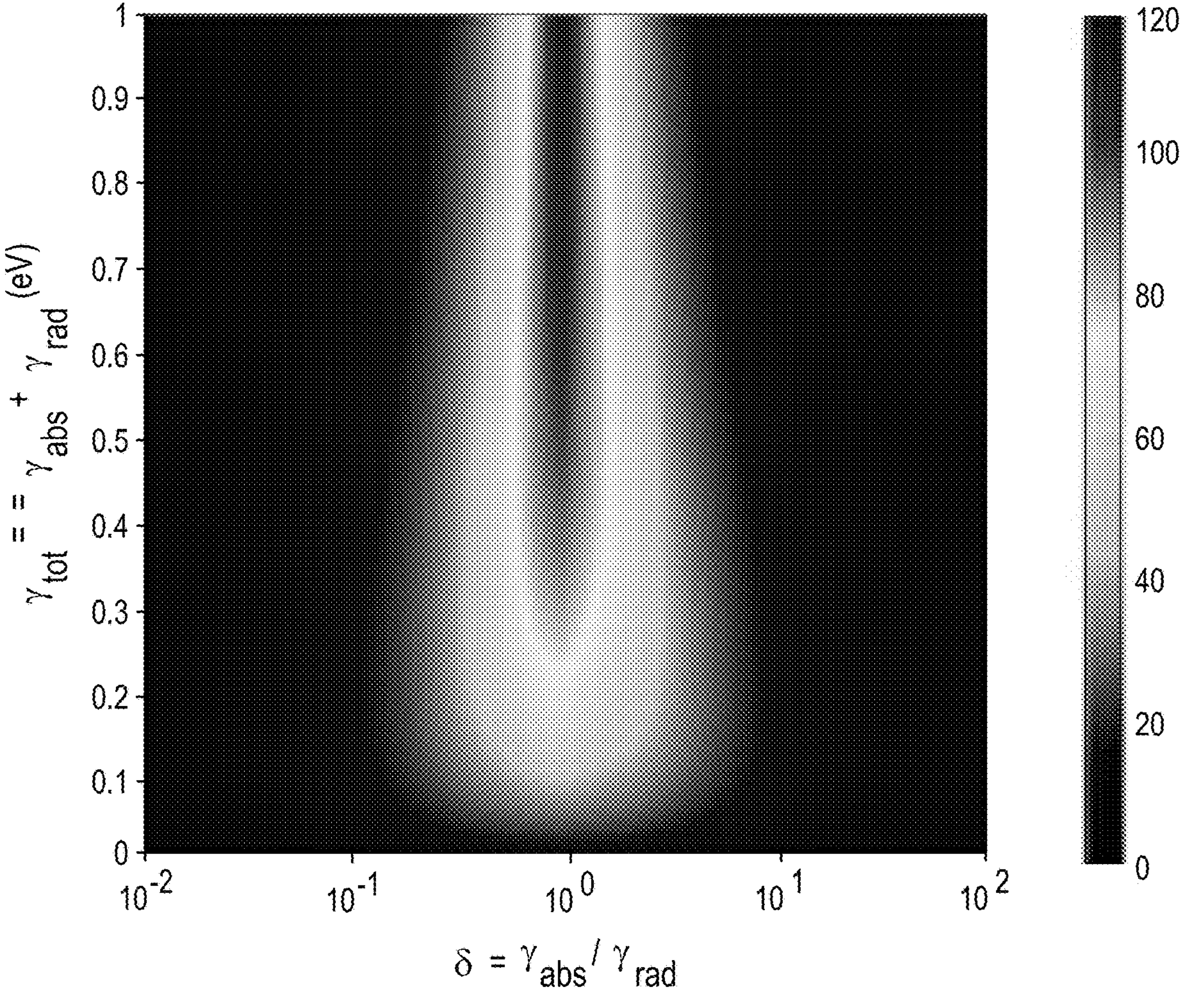

FIGS. 3A-3C. FIG. 3A shows a schematic model for a single port resonator. FIG. 3B shows a tri-layer stack with incident electric field amplitude normalized to 1 V/m (in air). FIG. 3C shows a color chroma represented in color map calculated from Eqn. 2 by varying two decay rates γ_abs and γ_rad. with an increment of chromaticity from blue to red.

Figure 4A:
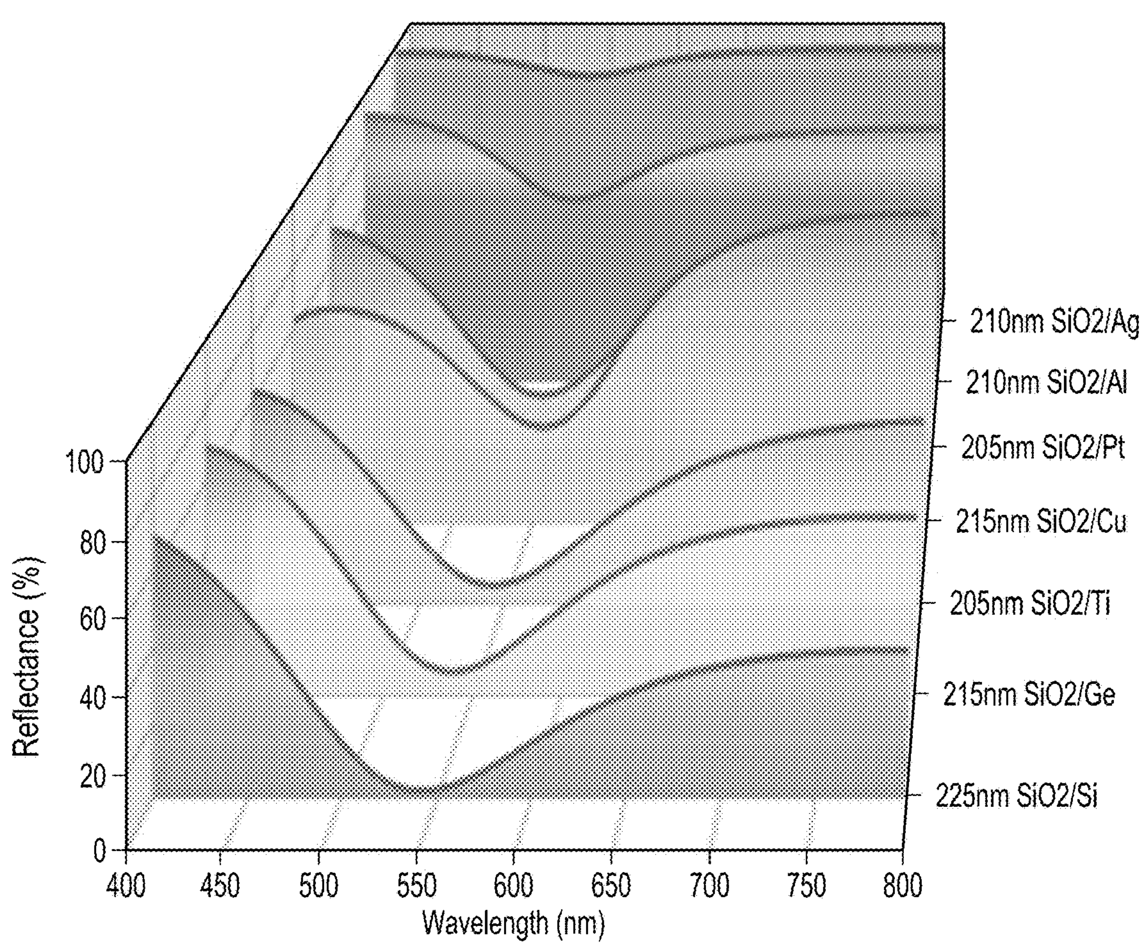
Figure 4B:
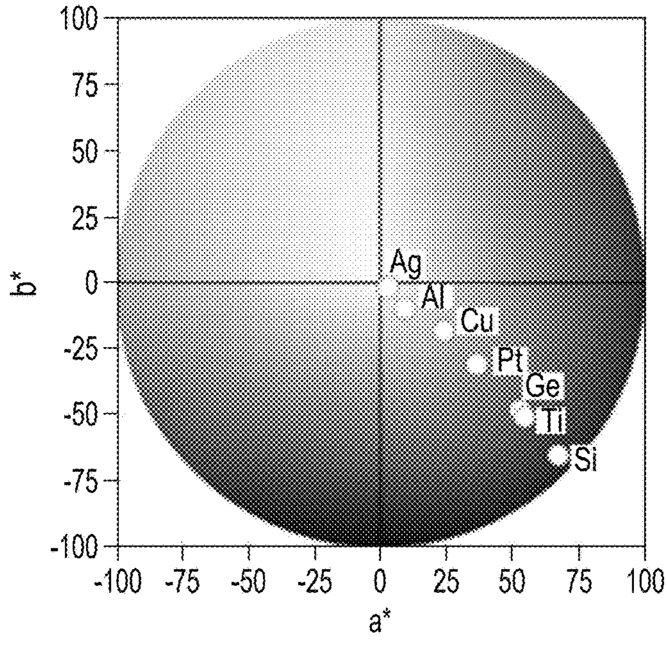
Figures 4C, 4D:
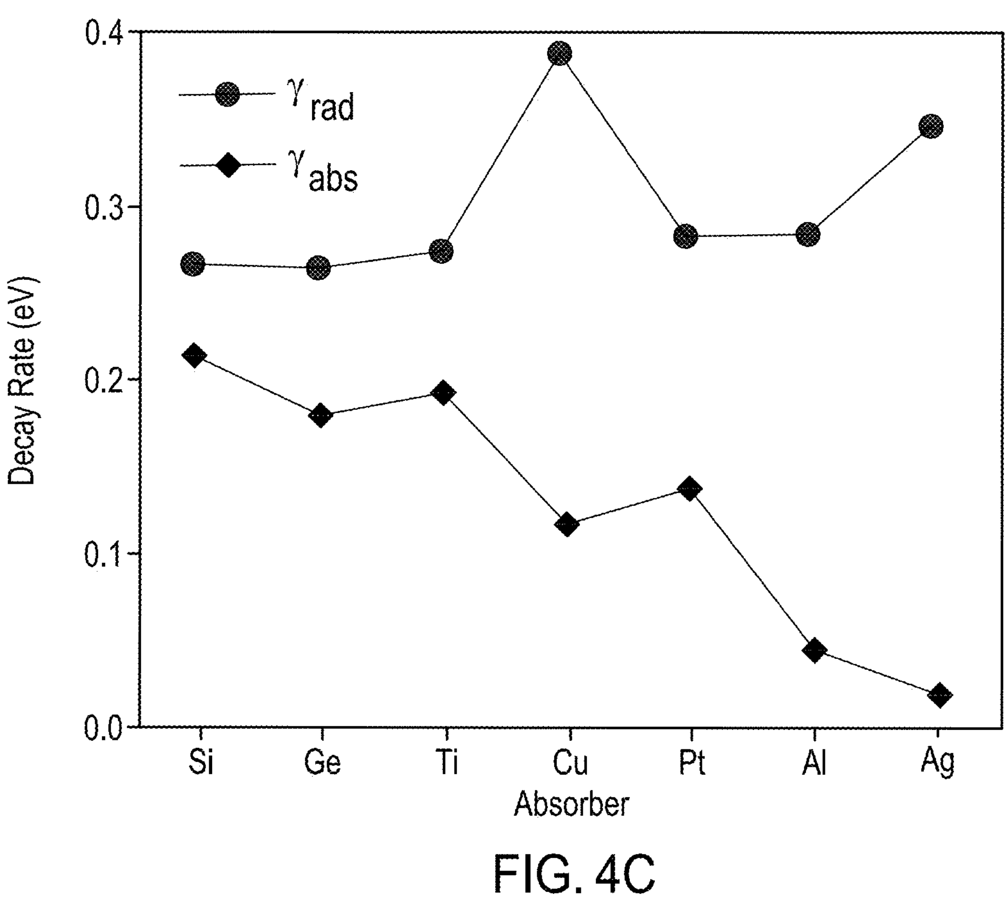

FIGS. 4A-4D. FIG. 4A shows reflection spectra of 25 nm $TiO_2/SiO_2$/Absorber calculated from TMM for dark magenta color. FIG. 4B shows CIEL*a*b* coordinates calculated from FIG. 4A. FIG. 4C shows decay rates extracted using TCMT for an assembly having 25 nm thick layers of $TiO_2/SiO_2$/Absorber structure. FIG. 4D shows color chroma calculated based on the extracted decay rates in FIG. 4C.

Figures 5A, 5B, 5C:
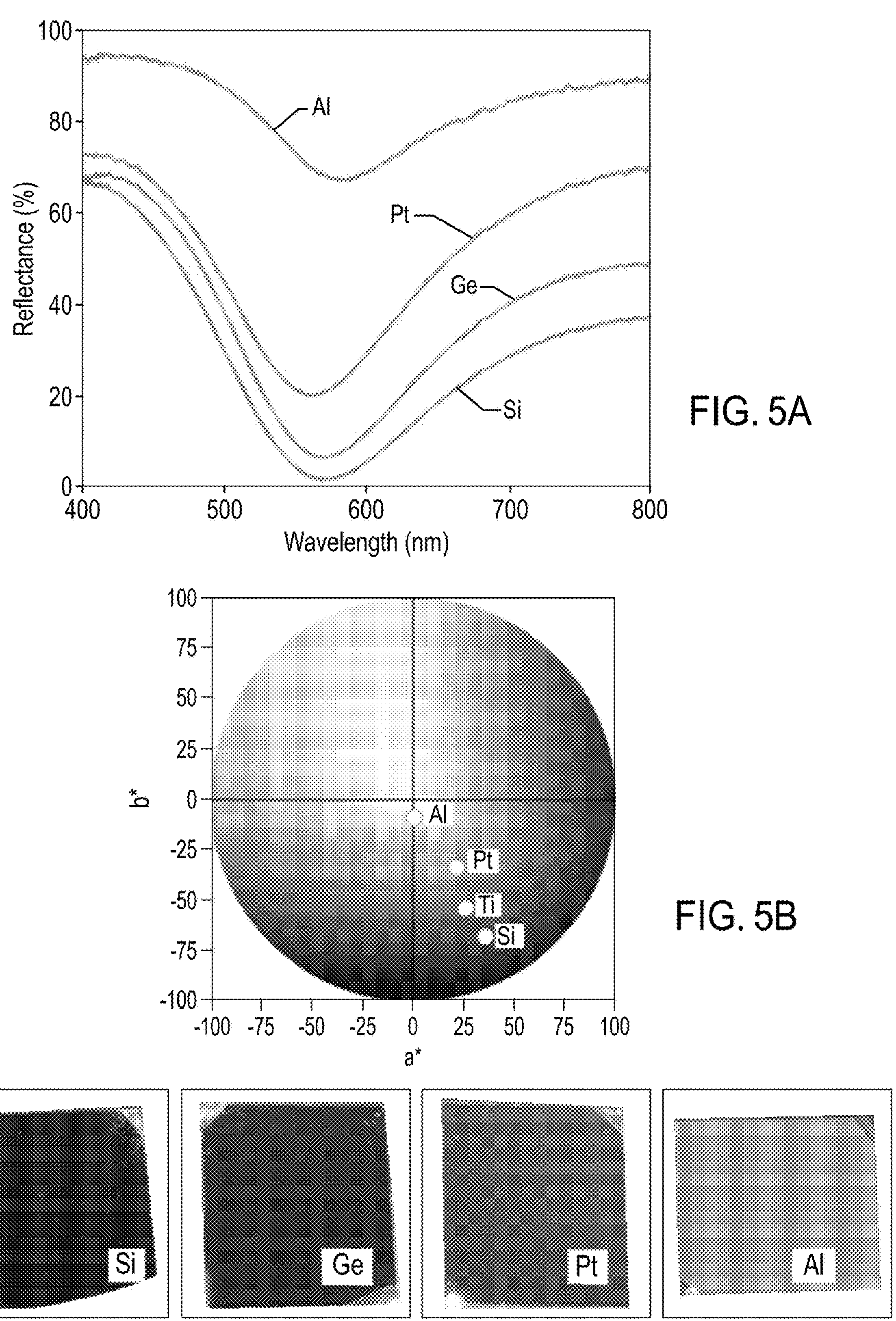

FIGS. 5A-5C. FIG. 5A shows measured reflection spectra of fabricated 25 nm $TiO_2/SiO_2$/Absorber and FIG. 5B shows their corresponding CIEL*a*b* coordinates. FIG. 5C shows photos of the colored samples in FIG. 5A taken under direct sunlight illumination. Scale bar: 1 cm.

Figure 6A:
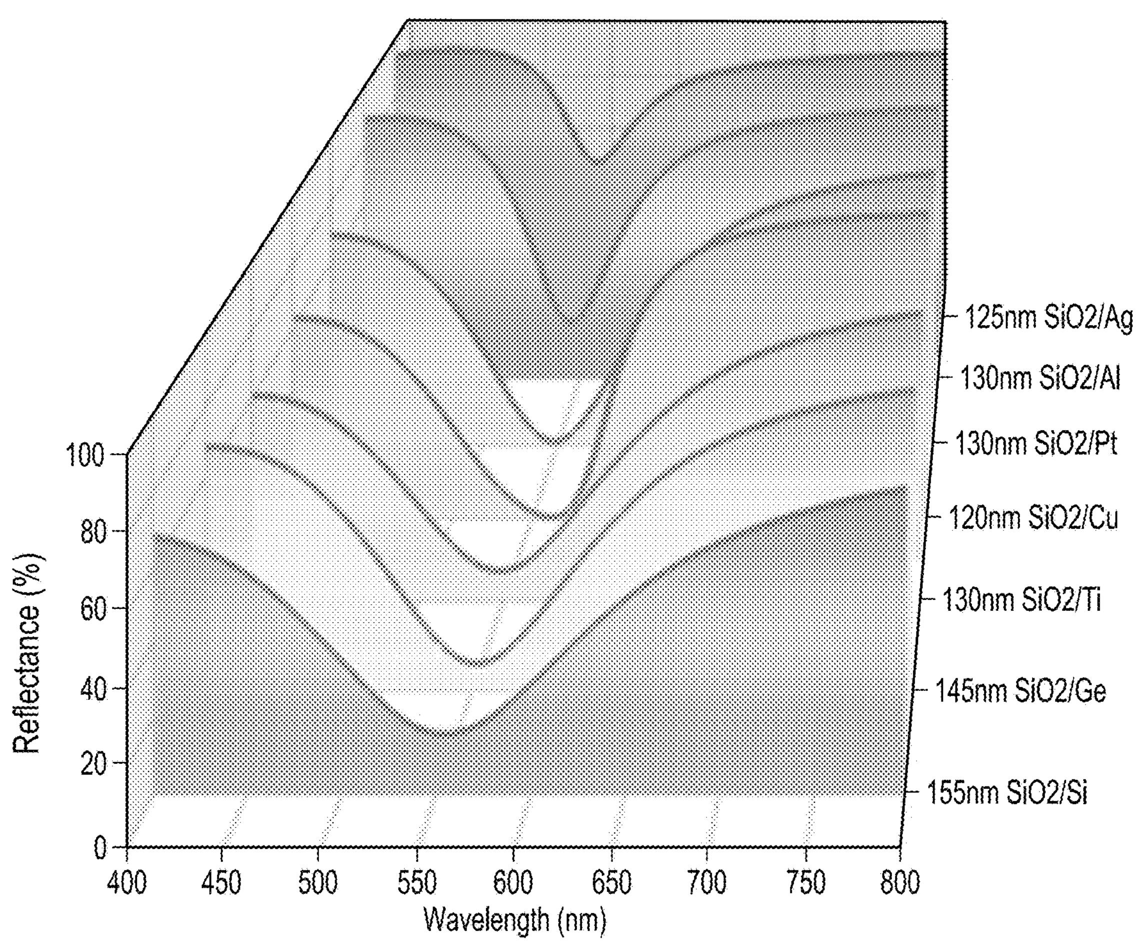
Figure 6B:
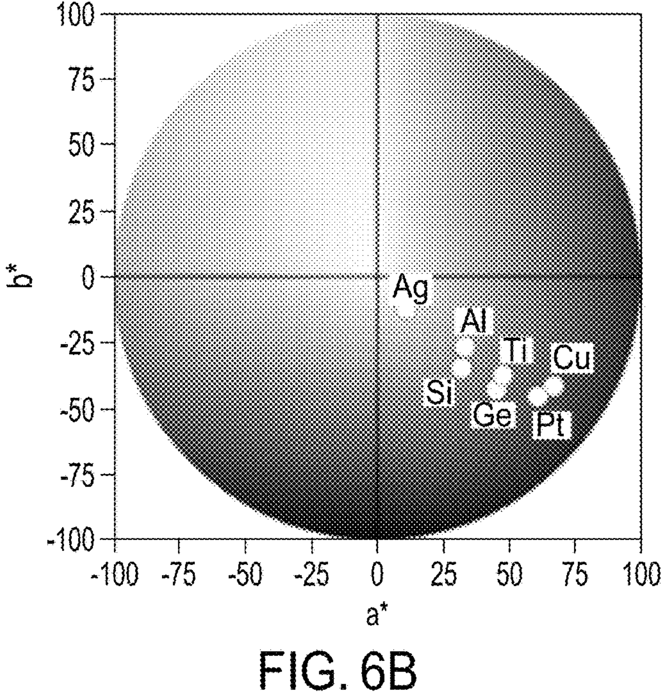
Figures 6C, 6D:
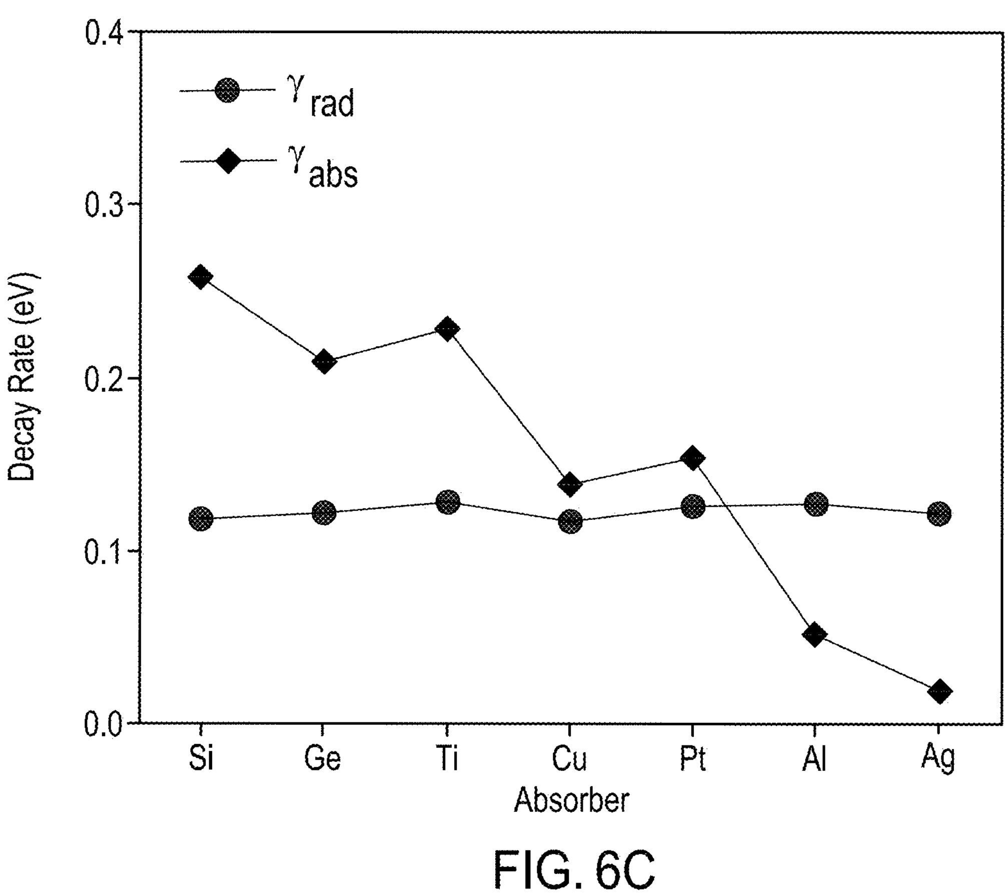

FIGS. 6A-6D. FIG. 6A shows reflection spectra of an assembly having 15 nm thick layers of $Ag/SiO_2$/absorber calculated from TMM for dark magenta color. FIG. 6B shows CIEL*a*b* coordinates calculated from FIG. 6A. FIG. 6C shows decay rates extracted using TCMT for 15 nm $Ag/SiO_2$/Absorber structure. FIG. 6D shows color chroma calculated based on the extracted decay rates in FIG. 6C.

Figure 7A:
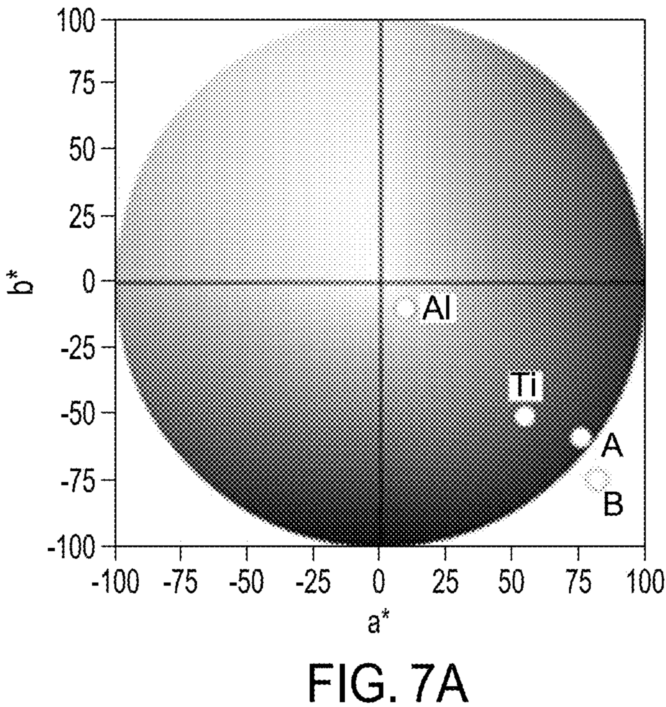
Figure 7B:
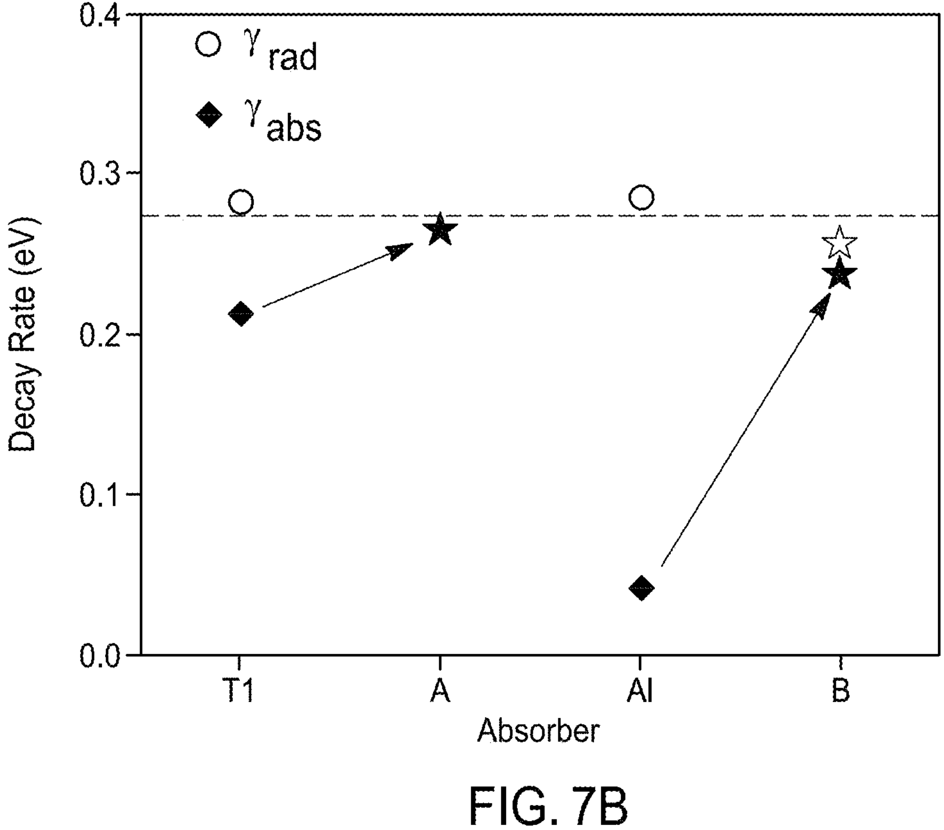
Figures 7C, 7D:
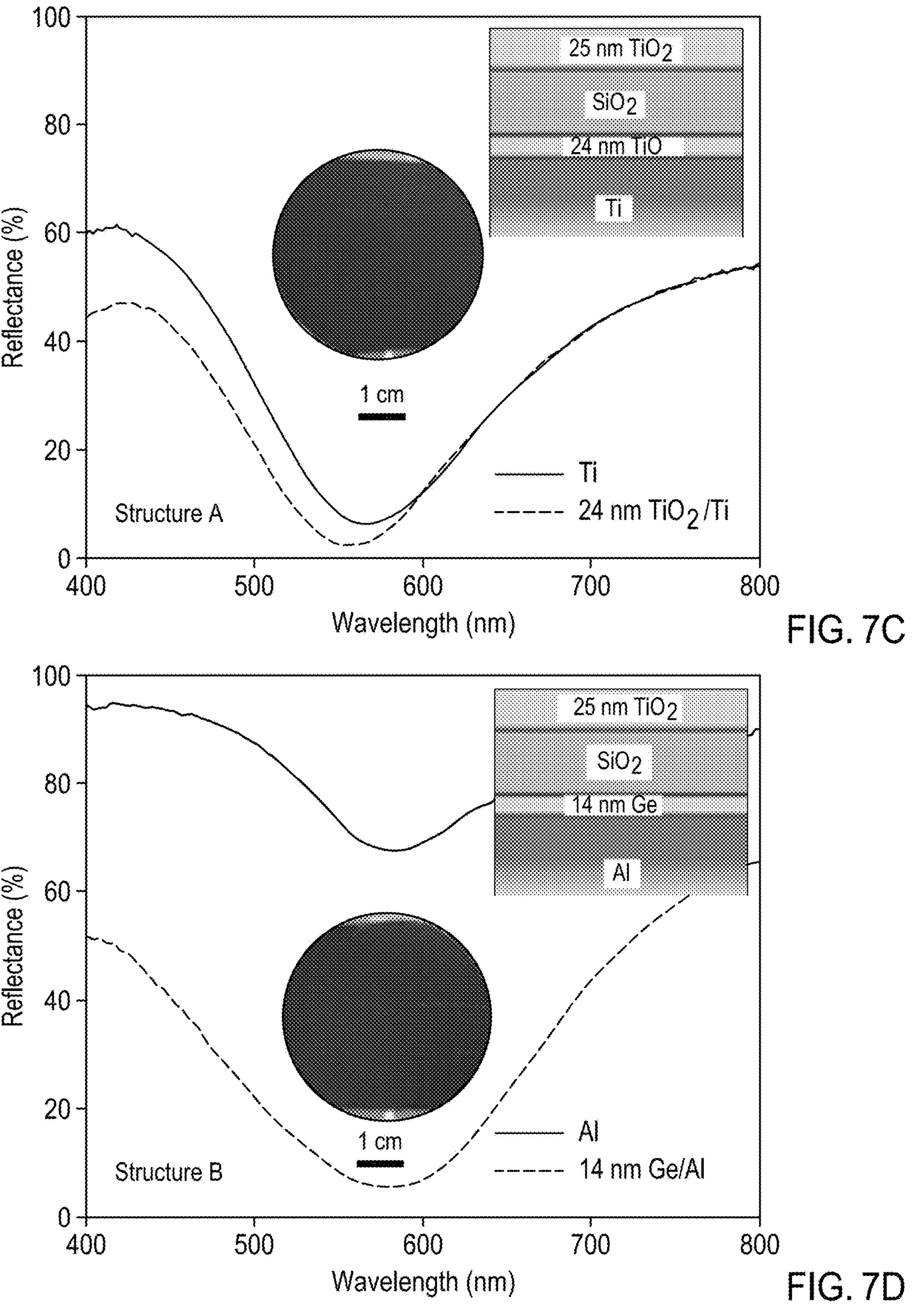

FIGS. 7A-7D. FIG. 7A shows CIEL*a*b* coordinates of structures A and B and their corresponding HLA structure calculated from TMM simulation. FIG. 7B shows a decay rate extracted using TCMT for structures in FIG. 7A. FIG. 7C shows experimentally measured reflection spectra of structure A and its corresponding HLA. Inset: Photo of fabricated structure A. FIG. 7D shows experimentally measured reflection spectra of structure B and its corresponding HLA. Inset: Photo of fabricated structure B.

Figure 8A:
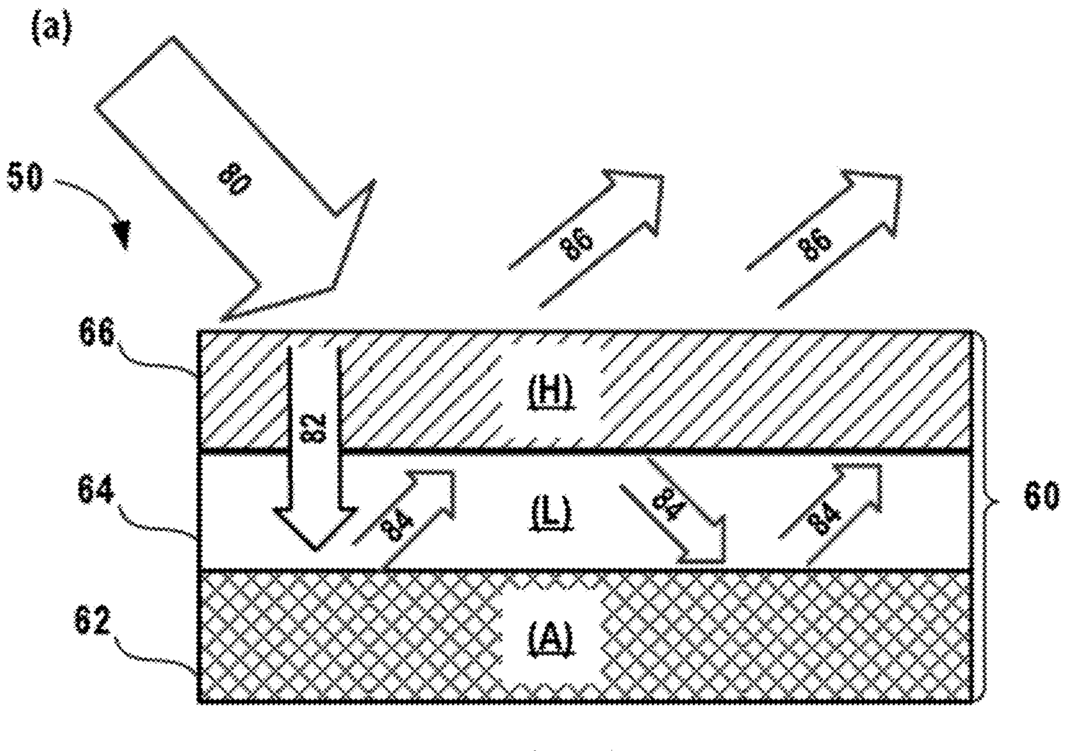
Figure 8B:
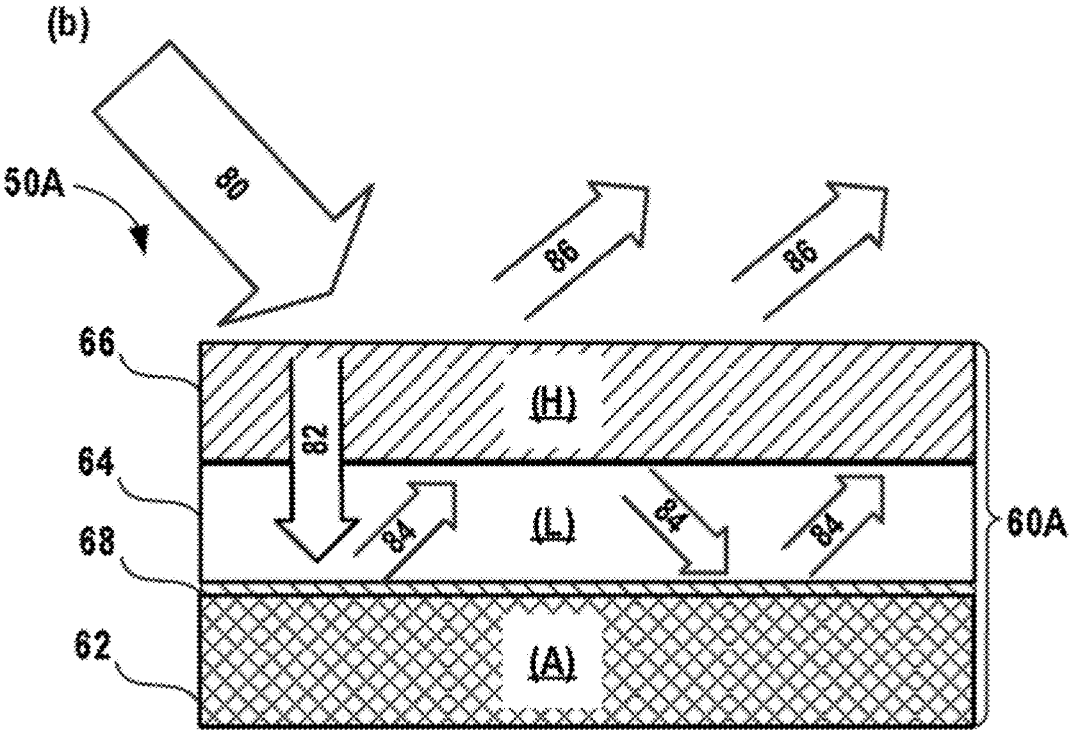

FIGS. 8A-8B. FIG. 8A shows an assembly having high chromaticity and vivid color generation that defines a resonator cavity comprising a multilayer stack in accordance with certain aspects of the present disclosure. FIG. 8B show an alternative variation of an assembly having high chromaticity and vivid color generation that defines a resonator cavity comprising a multilayer stack in accordance with certain alternative aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

As noted above, chromaticity or chroma is one of the three dimensions (lightness, hue, and chroma) for color representation and represents a perceived degree of color saturation. Quantifiable color differences may be objectively evaluated under International Commission on Illumination (CIE), L*a*b* system that expresses color as three values: L* for perceptual lightness, and a* and b* for the four unique colors of human vision, namely red, green, blue, and yellow. More specifically, a three-dimensional map can include L* that is an axis that represents lightness ranges from black (e.g., 0) to white (e.g., 100), a* that is an axis representing values corresponding to green to red (e.g., negative values towards green and positive values towards red), and b* that is an axis that representing values corresponding to blue to yellow (e.g., negative values towards blue and positive values towards yellow). Chromaticity (C) is defined here as $C=\sqrt{a^{*2}+b^{*2}}$, where a* and b* are the coordinates in the CIE L*a*b* diagram characterizing the hue level along the red-green and yellow-blue directions/axes. Generally, any high chroma color is one that sits at a periphery of the CIE L*a*b* color space. The larger the value of $C=\sqrt{a^{*2}+b^{*2}}$, the higher the color chroma.

As noted above, it has been a challenge to systematically tune color chromaticity in layered structures, apart from using numerical optimization methods to fine tune the layered structures. Among them, a Fabry-Pérot type resonator tri-layer stack can be a simple, but effective way of producing a large variety of colors. The colors seen from a tri-layer structure are typically associated with the optical resonance phenomenon in such an optical cavity, where a resonance dip is usually observed in the reflection spectrum, giving subtractive primaries like yellow, magenta, and cyan colors. Typical spectra behaviors are illustrated in FIGS. 1A-IF, where three different scenarios are compared to get a general idea of the spectra-chromaticity relation. Points further away from the center represent higher color chroma.

The present disclosure contemplates forming an assembly having high chromaticity and vivid color generation that defines a resonator cavity comprising a multilayer stack, which may be understood to form an asymmetric Fabry-Pérot resonator cavity. A Fabry-Pérot resonator cavity or etalon is an interference filter, whose operation is generally described in U.S. Pat. No. 9,261,753 to Guo et al, entitled "Spectrum Filtering for Visual Displays and Imaging Having Minimal Angle Dependence," the relevant portions of which are herein incorporated by reference.

The general operational principles of a multilayer resonator based on a Fabry-Pérot device prepared in accordance with certain aspects of the present disclosure generally relies on a source of electromagnetic radiation being directed towards the multilayer stack, such that the stack is placed in a transmission path of the electromagnetic radiation. More specifically, an electromagnetic wave may have wavelength (s) in the visible light range. The stack assembly includes a plurality of layers. A portion of electromagnetic energy enters the stack assembly and resonates between a pair of parallel reflective surfaces (like a Fabry-Pérot based etalon interference filter). A first component/portion of the electromagnetic energy (e.g., visible light) may be transmitted through the stack assembly and exit either as transmitted or reflected light, while a second component/portion of the electromagnetic energy may resonate as it reflects internally between the parallel reflective surfaces. Traditional Fabry-Pérot resonators exhibit highly frequency selective feature (high Q) in their reflection or transmission spectra, and in that case the transmission process does not involve any energy conversion or absorption. The stack assembly may define an asymmetric resonator cavity, where there are parallel reflective surfaces, but one has a higher transmission and another has a higher reflectivity to the electromagnetic radiation.

In certain aspects, the present disclosure provides methods for optimizing chromaticity of structural color devices that include a resonator cavity. The present disclosure further contemplates a structural color device or assembly that provides high chroma and thus vivid color generation. As will be described further below, in certain variations, a multilayer stack includes at least a first layer comprising a first composition comprising a light absorbing material (e.g., a semiconductor) that is disposed on a lower or bottom end of the structure (that can be abbreviated as "A" for absorber). At least a second layer comprising a second composition that includes a low refractive index material (that can be abbreviated as "L" for low index) is disposed along one side of the first layer (e.g., A layer). At least a third layer comprising a third composition including a high refractive index material (that can be abbreviated as "H" for high index) is disposed along a second side of the second layer (e.g., L layer) opposite to the side facing the first layer (e.g., A layer). Notably, as will be described herein, the first layer, second layer, or third layer may in fact comprise multiple distinct layers (or films or coatings) that provide the desired "layer" or component properties in the assembly, for example providing a multilayer light absorber component, a multilayer low refractive index or high refractive index component, and the like. The multilayer stack that comprises at least three material layers may be disposed on a substrate.

Any known substrate can be used for the high chroma structural color device and may serve as a structural support. In certain aspects, the substrate may absorb visible light, radiofrequency electromagnetic waves, or other ranges of wavelengths. Suitable examples of substrates include an inorganic dielectric material, such as silicon, silicon dioxide ($SiO_2$), a glass-based substrate, a metal, or a polymer, by way of non-limiting example.

As will be described further herein, the materials selected for the high refractive index layer (third or H layer)) and the low refractive index layer (second or L layer) provide a high refractive index contrast. By way of non-limiting example, at least one high refractive index material of the third layer (e.g., H layer) may have a real part of a refractive index (n) of greater than or equal to about 2, optionally greater than or equal to about 3, and optionally greater than or equal to about 4. Similarly, the low refractive index material of the second layer (e.g., L layer) may have a real part of the refractive index (n) of less than or equal to about 2. As will be appreciated by those of skill in the art, in certain aspects, so long as the high refractive index layer has a refractive index ($n_H$) that is greater than the refractive index ($n_L$) of the low refractive index layer, the values themselves may not be determinative. Rather a sufficient difference between the high refractive index and low refractive index materials can provide the desired color effect, for example, where a low refractive index layer has a refractive index ($n_L$) of about 2 and the high refractive index layer has a refractive index ($n_H$) of about 3 (despite both $n_L$ and $n_H$ being 2 or above).

As will be described herein, in certain variations, the second layer (e.g., L layer) may be disposed adjacent to and in contact with the third layer (e.g., H layer). The second layer (e.g., L layer) may also be disposed adjacent to and in contact with the first layer (e.g., A layer) in certain variations. In alternative aspects, the multilayer stack may include a fourth layer comprising a high refractive index material that has an ultrathin thickness that is disposed between the first layer (e.g., A layer) and second layer (e.g., L layer).

Thus, the present disclosure provides in certain variations a tri-layer based structure comprising a high-index/low-index/absorber (HLA) configuration for color generation. Further provided is an analysis and methods of how to produce high chroma color based on such layered structures. The tri-layer can be expanded to a four-layer assembly or stack for improved chroma. In the HLA structure, the absorptive loss only comes from the bottom absorber layer (the first "A" layer). The electric field is confined within a middle low refractive index layer (second "L" layer) due to the index contrast among the three layers that causes high reflection from the two outmost layers (in other words from the first "A" layer and the third "H" layer). Therefore, such a tri-layer structure can be considered a special, highly asymmetric Fabry-Pérot cavity. The present disclosure further provides an understanding of the spectra behavior of a Fabry-Pérot type tri-layer stack for subtractive structural color based on a temporal coupled mode analysis. This cavity-based analysis is able to fit the reflection spectra feature and predict the color chromaticity well even without taking the material dispersion into account. To produce the most chromatic color, the analysis reveals that a matching of the absorptive and radiative decay rates, which each is respectively maximized leads to a broad and highest absorption peak and thus high chroma. An inclusion of an ultrathin high index dielectric on top of the lossy bottom layer can further boost the cavity absorptive decay rate, which helps to finetune the color chroma. Both simulation and experimental results are presented in accordance with color chromaticity predicted by the temporal coupled mode analysis.

A first scenario refers to the two spectra with exactly the same resonance dip but different background reflections (FIG. 1A), where the corresponding CIEL*a*b* coordinates indicate a higher chromaticity is achieved with a lower background reflection (FIG. 1D). In a second scenario, two spectra with the same level of background reflection are presented but with a difference in their reflection minimum (FIG. 1B). The corresponding chromaticity diagram then favors the spectra with a lower reflection minimum (FIG. 1E). The last scenario, where both spectra have the same reflection minimum but a different in dip width (FIG. 1C), reveals a higher chromaticity with a further broadening of the dip (FIG. 1F). In view of this, a high chromatic color usually requires a low minimum reflection on resonance, as well as a certain broadening of the dip.

It would be desirable to have a high-level understanding between a multilayer structure's cavity behavior and its chromaticity performance, along with design principles for each layer, which demonstrate very high chroma colors. Here, a temporal couple-mode (TCM) analysis can be used to describe such a tri-layer system with two energy decay channels for absorption and radiation. While transfer matrix method (TMM) calculation requires exact material dispersion, temporal coupled mode theory (TCMT) does not. However, the two methods provide a fairly good match as shown in (FIGS. 2A-2F, showing silicon (Si) (FIG. 2A), germanium (Ge) (FIG. 2B), titanium (Ti) (FIG. 2C), platinum (Pt) (FIG. 2D), aluminum (Al) (FIG. 2E), and silver (Ag) (FIG. 2F)) especially in the vicinity of the resonance wavelength. The spectra feature and resulting color chroma can be fully captured as competition between the two decay rates. A high chromatic color is realized where decay rates are large and well-balanced simultaneously, which fully coincides with the observation shown in FIGS. 1A-1F. Instead of a wavelength-by-wavelength calculation, a resonance wavelength based analysis is capable of predicting the chromaticity performance for the tri-layer subtractive structural color provided by certain aspects of the present disclosure.

A conventional analysis for multilayer structural color usually starts with the multilayer interference model followed by a phase analysis for each layer to determine the resonance feature of the resulting spectra or color appearance. A perfect absorption at the designed wavelength is reached if the multilayer reflection wave cancels the direct reflection at the first interface in both phase and amplitude. However, since the multilayer interference formalism calculates the reflection layer by layer, limited information can be extracted to understand the effect of material optical properties has on the entire stack as well as its color performance. To address this problem, another way of understanding the multilayer structural color based on cavity analysis is developed. More specifically, a rather simple but effective tri-layer structure is used (e.g., metal/dielectric/metal) that can produce a wide range of colors from yellow, magenta to cyan. The tri-layer structure forms a simple Fabry-Pérot (F-P) cavity, with the resonance mode being defined by cavity thickness. With the light incident onto the multilayer resonator surface, part of the energy is directly reflected from the top surface and the rest couples into the cavity. By using a sufficiently thick and absorbing bottom layer, the resonance energy leaks out in the same direction as the direct reflection, hence a single port model can be used.

The temporal coupled mode theory (TCMT) is established based on the time-dependent formalism of an optical resonator. As stated above, a single-mode optical resonator with only a single port coupled to the environment is considered. Such a model can be used to completely describe a simple tri-layer structure with only a reflection port at resonance condition. As illustrated in FIG. 3A, the dynamic of the field amplitude A inside the resonator can be describe as follows:

$$\begin{cases} \frac{dA}{dt} = (-i\omega_0 - \gamma_{abs} - \gamma_{rad})A + c_{in}E^{in} \\ E^{out} = c_{bkg}E^{in} + c_{out}A \end{cases} \quad \text{Eqn. 1}$$

Where $\omega_0$ is the resonant frequency, $c_{in}$ is the coupling coefficient between the resonance and incoming wave, $\gamma_{abs}$ and $\gamma_{rad}$ are the decay rates of the resonance due to intrinsic resonator absorption and external leakage, respectively. $c_{bkg}$ is the background reflection coefficient directly connecting the in- and out-going waves, which only adds a phase $\phi$ to the incoming wave if the cavity is lossless, and $c_{out}$ is the coupling coefficient between the resonance and the outgoing wave. Considering the law of energy conservation as well as time-reversal symmetry, it can be found that $$c_{in} = c_{out} = \sqrt{2\gamma_{rad}}\, e^{i\left(\frac{\phi}{2}+\frac{\pi}{2}+N\pi\right)}$$

with N to be an arbitrary integer. Eqn. 1 can be further solved for the reflection coefficient as:

$$r = \frac{E^{out}}{E^{in}} = e^{i\phi} + \frac{2e^{i\phi}\gamma_{rad}}{-i(\omega-\omega_0)+\gamma_{rad}+\gamma_{abs}} \quad \text{Eqn. 2}$$

Absorption can be calculated as:

$$\text{Abs} = 1 - r*r = \frac{4\gamma_{rad}\gamma_{abs}}{(\omega-\omega_0)^2 + (\gamma_{rad}+\gamma_{abs})^2} \quad \text{Eqn. 3}$$

Therefore, a perfect absorption (i.e., unity absorption) can be achieved at resonance ($\omega$–$\omega_0$) only when $\gamma_{abs}=\gamma_{rad}$, which is typically referred to as the critical coupling condition. The absorptive and radiative quality factors can be obtained respectively as:

$$Q_{abs} = \frac{\omega_0 U}{P_{abs}} = \frac{\omega_0}{2\,\gamma_{abs}},\; Q_{rad} = \frac{\omega_0 U}{P_{rad}} = \frac{\omega_0}{2\,\gamma_{rad}} \quad \text{Eqn. 4}$$

With U as the energy stored inside the cavity, $P_{diss}$ and $P_{abs}$, represents the dissipation power due to absorption and radiation, respectively. Note that the reflection spectrum features are strongly related to an overall decay rate $\gamma_{tot}=\gamma_{abs}+\gamma_{rad}$, which determines a broadening/width of the resonance in the spectrum and the ratio ⟦ δ=γ. abs/γ_rad determines the minimum reflectance at resonance wavelength. When δ=1, the reflection dip can reach zero, corresponding to the critical coupling condition.

As noted above, chromaticity is defined as $C=\sqrt{a^{*2}+b^{*2}}$, where a* and b* are the coordinates in the CIEL*a*b* diagram characterizing the hue level along the red-green and yellow-blue directions. FIG. 3C illustrates C as a function of δ and γ_tot at different resonance wavelength, where the red region indicates a high color chroma and the blue region indicates the opposite. High color chroma region is clearly identified in the vertical central region when the two decay rates are matched, and the highest chroma is achieved toward the top of the red region when both decay rates are maximized. Though the chromaticity varies greatly over different resonance wavelengths due to the correlation between lightness and chroma, they share the same spectrum features in achieving high chroma color. Hence, a simple yet general design principle is provided to achieve high chroma in single cavity-based structural colors.

Compared with the multilayer interference theory, TCMT treats the entire structure as a whole and focuses more on the material effects on cavity behavior. Factors affecting the resonance can be more intuitively understood by phenomenological parameters, i.e., the influence of material optical properties on the absorption feature can be characterized with the extraction of the two resonance decay channel rates responsible for absorption and radiation respectively. As a model system, the extraction of the two decay rates of a tri-layer structure (FIG. 3B) is derived in the following based on Maxwell's equations. assuming a plane wave incident at a normal angle with no transverse mode being excited inside the cavity (i.e., $h_3>>0$), the electromagnetic fields in each layer can be determined from the boundary conditions at each interface (e.g., continuity of tangential E-field and H-field across the interface). The reflection coefficient can then be calculated based on the Fresnel equation, where both real and imaginary part of the refractive index plays an important role. Take the lossless-lossy material interface with refractive indices $n_0$ and $n-i\kappa$, the reflectivity can be expressed as:

$$R=\frac{\left(\frac{n_0}{n}-1\right)^2+\left(\frac{\kappa}{n}\right)^2}{\left(\frac{n_0}{n}-1\right)^2+\left(\frac{\kappa}{n}\right)^2}\qquad\text{Eqn. 5}$$

Several conclusions can be drawn from Eqn. 5. First, a minimum reflectivity can be achieved only when the lossless refractive index squared matches the sum of the real and imaginary part of the lossy material squared $$\left(\text{i.e., } n_0^2=n^2+\kappa^2\right).$$

Second, a significant amount of reflection can be generated when either $$\frac{\kappa}{n}$$

is very large or $n>>n_0$, $\kappa\rightarrow 0$. A close to unity reflection could be achieved once $$\frac{\kappa}{n}\rightarrow+\infty.$$

This explains why silver, though having a very large imaginary part accounting for absorption still has an ultrahigh reflectivity across the entire visible range, and copper or gold have very high reflectivity at longer wavelengths.

Electric and magnetic fields in layer i can be expanded as $$E_i=a_i^+e^{ik_iz}+a_i^-e^{-ik_iz},\ \text{ and }\ H_i=\frac{n_i}{z_o}\left(a_i^+e^{ik_iz}-a_i^-e^{-ik_iz}\right)$$

$$E_i=a_i^+e^{ik_iz},$$

with $k_i$ being the wavevector, and the boundary conditions at three interfaces ($z=-h_2$, 0, $h_3$) are written as:

$$\begin{cases} a_1^+e^{ik_1h_2}+e^{-ik_1h_2}=a_2^+e^{ik_2h_2}+a_2^-e^{-ik_2h_2} \\ \frac{1}{z_0}\left(a_1^+e^{ik_1h_2}-e^{-ik_1h_2}\right)=\frac{n_2}{z_0}\left(a_2^+e^{ik_2h_2}-a_2^-e^{-ik_2h_2}\right) \\ a_2^++a_2^-=a_3^++a_3^- \\ \frac{n_2}{z_0}(a_2^+-a_2^-)=\frac{n_3}{z_0}(a_3^+-a_3^-) \\ a_3^+e^{-ik_3h_3}+a_3^-e^{ik_3h_3}=a_4^-e^{ik_4h_3} \\ \frac{n_3}{z_0}\left(a_3^+e^{-ik_3h_3}-a_3^-e^{ik_3h_3}\right)=-\frac{n_4}{z_0}\left(a_4^-e^{ik_4h_3}\right) \end{cases}\qquad\text{Eqn. 6}$$

where all fields are normalized with respect to the incident field $$E_1^-(z\geq h_2)=1$$

$h_2$)=1 and $Z_0$ represents the vacuum impedance. By solving the electric field from Eqn. 6, time-averaged energy stored inside the cavity $U=U_{E3}+U_{H3}$ can be extracted as:

$$\begin{cases} U_{E3}=\frac{1}{2}\text{Re}\left\{\varepsilon_0\varepsilon_3\int_{-h_3}^{0}E_3^*E_3dz\right\} \\ U_{H3}=\frac{1}{2}\text{Re}\left\{\varepsilon_0\varepsilon_3\int_{-h_3}^{0}H_3^*H_3dz\right\} \end{cases}\qquad\text{Eqn. 7}$$

where $\varepsilon_0$ is the vacuum permittivity.

Absorptive dissipation power can be derived from the absorption decay channel. Since both the top and bottom layers (layer 2 and layer 4) may absorb light, the total dissipated power from absorption is the sum of these two layers $P_{abs}=P_{2,abs}+P_{4,abs}$ and:

$$\begin{cases} P_{2,abs}=\frac{1}{2}\text{Im}\{\varepsilon_0\varepsilon_2\}\int_{0}^{h_2}E_3^*E_3dz\} \\ P_{4,abs}=\frac{1}{2}\text{Im}\{\varepsilon_0\varepsilon_4\}\int_{0}^{-h_3}E_4^*E_4dz\} \end{cases}\qquad\text{Eqn. 8}$$

Hence, the absorptive decay rate $\gamma_{abs}$ can be calculated based on Eqn. 4. Next, the power dissipated through radiation loss from the cavity is evaluated. Note that the total reflected power from the cavity contains both the background reflection directly from the incoming wave and the power coupled out of the cavity (Eqn. 1). Therefore, in order to evaluate the power dissipated purely from the cavity, a pure phase term $e^{i\phi}$ upon background reflection should be taken away from the outgoing wave:

$$P_{rad} = \frac{1}{2}|a_1^+ - e^{i\phi}|^2 \mathrm{Re}\left\{\oint \overrightarrow{E_1} * \times \overrightarrow{H_1}\, d\overrightarrow{S}\right\} \quad \text{Eqn. 9}$$

As a result, the radiative decay rate $\gamma_{rad}$ can be calculated based on Eqn. 4. Hence, both absorptive decay rate and radiative decay rate can be extracted from a tri-layer cavity, providing a new insight for understanding its color performance from a cavity-based point of view.

Chromaticity of Tri-Layer HLA Structural Color

The above analysis can be applied to a simple tri-layer structure formed of a high-index/low-index/absorber (HLA) configuration and can be verified with experimental results. In the HLA structure, the absorptive loss only comes from the bottom absorber. The electric field is confined within the middle low refractive index layer due to the index contrast among the three layers that causes high reflection from the two outmost layers. Therefore, such a tri-layer structure can be considered a special, highly asymmetric Fabry-Pérot cavity. While there may be no specific requirement in the thickness of each layer (except the bottom or first "A" absorber layer, which needs to be sufficiently thick to block any transmission), the top high-refractive index layer is kept thin so there is negligible resonance inside and the single cavity analysis applies.

The TCMT analysis is then applied to understand how the bottom absorber (first "A" absorber layer) properties affect the overall color performance of the structure. In this example, $TiO_2$ and $SiO_2$ as the high-index and low-index layers due to their easy accessibility and very-well developed coating techniques. Four different hues (FIG. 4A), namely yellow, magenta, dark magenta, and cyan, are chosen as examples to evaluate the color performance of the HLA structure as well as the effect of absorbers. Several absorbing materials with very different optical properties are chosen to provide experimental demonstrations of the two types of decay rates on the color chroma. The materials include silicon (Si), germanium (Ge), titanium (Ti), platinum (Pt), aluminum (Al) and silver (Ag), copper (Cu), and gold (Au). These absorbers have different degrees of light reflection in order to vary the radiative decay rates: silver reflects almost all light across the visible range, silicon reflects only 30% of the spectrum, and copper/gold reflects different wavelength bands due to their absorption from interband transition. In order to effectively compare the color performance of various absorbing materials in the 25 nm $TiO_2$/$SiO_2$/absorber, the thickness of the middle dielectric layer ($SiO_2$) is carefully tuned due to the nontrivial phase upon light reflection from the interface of $SiO_2$/Absorber to ensure all structures gives the same hue. The top $TiO_2$ thickness is fixed to be 25 nm, offering a large refractive index contrast but avoiding any resonance mode within the layer.

Chromaticity is then calculated for each sample according to the simulated reflection spectrum from the transfer matrix method (TMM) with all material refractive index being extracted from experiments. FIGS. 4A-4B give an overview of the HLA color performance in the CIEL*a*b* diagram with the $SiO_2$ layer thicknesses being carefully tuned to ensure a similar dark magenta hue for different absorber substrates (with resonance dip at about 540 nm, FIG. 4A). The tri-layer stack with Si as the absorbing substrates give the best chromaticity followed by Ge or Ti, and then Pt, Cu, Al, and Ag (FIG. 4B).

TCM analysis is being implemented to reveal the above difference where the deterioration in color chroma is a result of the unbalanced rate between two decay channels (FIG. 4C), i.e. $\gamma_{abs}$ and $\gamma_{rad}$ being the absorption loss from the $SiO_2$-Absorber interface and the radiative loss leaving the cavity respectively. With a very similar structure where only the bottom substrate is responsible for absorption, the radiative loss $\gamma_{rad}$ remains high and about the same for structures (except for a jump in Cu is observed in FIG. 4C near 540 nm). On the contrary, a huge difference in absorption loss $\gamma_{abs}$ among different absorbers is observed. It turns out that Si has the largest absorption loss to match the radiative loss, followed by Ti, Ge, Pt, Cu, Al, and Ag. Therefore, in these examples/experiments, the best chromaticity is achieved with Si followed by the order observed in FIG. 4B.

As illustrated in FIG. 3C, the chroma of a color with a Lorentzian line shape absorption depends on the relative ratio $\delta$ between $\gamma_{abs}$ and $\gamma_{rad}$ as well as their sum $\gamma_{tot}$. Hence, the chromaticity of the aforementioned HLA structural color can be predicted based on the extract $\delta$ and $\gamma_{tot}$ values. As shown in FIG. 4D, the predicted color chroma matches very well with the ones from the TMM calculation (FIG. 4B) considering dispersion is being excluded in the TCM calculation, which validates the proposed model. Even colored metal like Cu and Au shows a reasonable match in most of the situations, except where the inherent absorption becomes too strong for the TCMT to catch the broadening of the spectrum (e.g., Cu for magenta color). The validity of TCM analysis can be further justified by comparing the absorption spectra (FIGS. 2A-2F) derived from TMM and TCM. Though a Lorentzian line shape with no material dispersion is being assumed in the derivation of TCM, the absorption spectra match fairly well with those obtained by TMM where the absorbance is rigorously calculated at each frequency, especially near the vicinity of resonance. Such a coincidence is attributed to the Lorentzian line shape nature of the Fabry-Pérot cavity with little dispersion near the resonance wavelength. The TCM spectra start to deviate from the TMM spectra when the frequency is going farther away from the resonant frequency where strong dispersion comes into play. However, the TCM-calculated spectrum catches most of the features near resonance except for the amount of background absorption which only affects the lightness of the color rather than chroma. Similar trends are also observed with other colors in yellow, magenta, and cyan by changing the $SiO_2$ layer thickness (for example, gold is not capable of showing any magenta or cyan-like color due to its strong absorption in the short wavelength).

Experimental realization of the HLA structure is carried out to support the aforementioned material-spectra-color relationship based on TCM analysis. As shown in FIGS. 5A-5C, five HLA samples are fabricated using e-beam evaporation with Al, Pt, Ge, and Si as substrate absorbers. Huge chroma difference is observed across these samples with Si performing the best while Al shows almost a neutral color. The measured reflection spectra (FIG. 5A) show a red shift in the resonance wavelength compared to the designed dark magenta color (FIG. 4), due to a lack of deposition thickness control in the $TiO_2$ layer. Nevertheless, the chromaticity (FIG. 5B) and color appearance (FIG. 5C) still matches closely to what TCMT predicts.

Chromaticity of Tri-Layer MDM Structural Color.

In the previous case of 25 nm $TiO_2$/$SiO_2$/Absorber structure, the radiative loss is always larger than the absorption loss ($\gamma_{abs}>\gamma_{rad}$) for the absorber selected (FIG. 4C), indicating the system is always in an under-coupled regime due to the single lossy channel within the cavity. As a result, the produced color accidentally resembles the trends of the absorber absorbance. To remedy this problem and also show that TCM is valid for other forms of tri-layer structures, a metal/dialectic/metal (MDM) structure is considered in the form of 15 nm Ag/$SiO_2$/Absorber, where both the top and bottom layer are responsible for the absorptive loss. Similar to the case of HLA, the $SiO_2$ layer in MDM structure with different thicknesses are being calculated to achieve the same dark magenta color for various absorbing substrates (FIG. 6A). The CIEL*a*b* diagram is being plotted for chroma comparison based on TMM simulation. In contrast to the HLA structure proposed before, the 15 nm Ag/$SiO_2$/Absorber structure shows a very different trend (FIG. 6B) in color chroma: the chromaticity order does not follow the decreasing order of absorber reflection as was the case for HLA where the structure with Si substrate takes the lead. Instead, the structure with Pt shows the best chromaticity takes (except for the yellow color, where gold has intrinsic broadband absorption at shorter wavelengths). Further extraction of the decay rates (FIG. 6C) reveals the underlying mechanism responsible for this change in trend. Once the top layer of the cavity has been changed from $TiO_2$ to Ag, an increment in the absorption loss is observed due to the absorptive nature of silver as well as a decrease in the radiative loss with the electric field being more confined and enhanced inside the $SiO_2$ layer (e.g., a better cavity quality). Therefore, the Ag/$SiO_2$/Absorber system can explore both the under-coupled regime ($\gamma_{abs}>\gamma_{rad}$) and the over-coupled regime ($\gamma_{rad}>\gamma_{abs}$) and even critical coupling when the two decay constant matches with each other. High-loss absorbers such as Si, Ge, and Ti set the cavity under over-coupling, while low-loss absorbers like Al and Ag set the cavity under under-coupling. With moderate absorption near 550 nm, Cu and Pt pushes the cavity close to critical coupling and therefore give the best chroma performance. These trends are being fully captured by TCMT as shown in FIG. 6D. Similar chromaticity performances are also observed in yellow, magenta, and cyan color by changing the $SiO_2$ layer thickness. Another observation made out of the above HLA and MDM structure indicates a wider color gamut can be achieved when a high chroma color can be achieved. A wider span in color space is observed with Si or Pt in the 25 nm $TiO_2$/$SiO_2$/Absorber or 15 nm Ag/$SiO_2$/Absorber structure when the $SiO_2$ thickness is swept from 0 to 400 nm with 5 nm interval.

Improving Color Chromaticity with TCM.

The conclusions from TCM analysis can also help to address some challenges in structures that normally yield low color chroma. One such case occurs where cavities have too high of background reflection, which makes it very difficult to cause complete destructive interference with the reflected beam from the top surface. With the understanding that a matching of the two decay rates is required to yield high chroma, an increment in the absorptive loss is desired with a highly reflective substrate. Considering the large imaginary part k of a typical high reflective substrate, an enhanced interfacial absorption can be made between a high refractive index dielectric and the substrate according to Eqn. 5, where a match between $$n_0^2$$

and $n^2+\kappa^2$ can be approached. Hence, an ultrathin high refractive index material can be inserted between low refractive index ($SiO_2$) layer and the absorber to improve its color chroma while minimizing any structural change to the stack.

A few examples are provided herein to illustrate. In one example, a thin layer of lossless $TiO_2$ is inserted between the $SiO_2$ and Ti layer, resulting in structure A. A TCM calculation indicates that the absorption loss is being increased (FIG. 7B) due to the addition of the high refractive index $TiO_2$ layer. As a result, an improvement in color can be clearly seen in FIG. 7A (from a bare Ti substrate to structure A). In the second example, a thin Ge layer is added right on top of Al, giving structure B, having 25 nm $TiO_2$/$SiO_2$/Ge/Al. With an increment in Ge thickness, a second dip with increasing resonance wavelength is observed, which corresponds to an extra resonance cavity within the Ge layer due to its high refractive index. This effect is related to the resonance effect formed within an ultra-thin Ge layer on the metal surface due to the complex reflection coefficient contributing to a very large reflection phase. 14 nm thick Ge is selected as an add-on layer (25 nm $TiO_2$/$SiO_2$/14 nm Ge/Al) where resonance inside Ge layer overlaps the resonance of the original HLA cavity and thus broadens the reflection dip. On the other hand, the lossy nature of Ge also boosts the absorption loss of the entire cavity (FIG. 7B). As a result, the color chromaticity gets significantly improved as plotted in FIG. 7A. The as fabricated sample based on structures A and B with dark magenta color are shown in FIGS. 7C-7D inset along with the change in the reflection spectra compare to their original HLA design. The same strategy works for other colors in yellow, magenta, and cyan as well. It is worth noting that the extracted decay rates of structure B underestimate the broadening of the dip from the second resonance inside the Ge layer. This can be understood as the current TCM model only accounts for a single cavity with a single port where the absorption line shape is a Lorentzian function as expressed in Eqn. 3.

In summary, a cavity-based temporal analysis is developed and applied to tri-layer structures to gain insight into the color chroma behavior and provide a method for designing high chroma structures. The experimental results show that the TCM approach is very promising in predicting the chromaticity of the tri-layer structure, even without the inclusion of material dispersion. A high chromatic subtractive color can be achieved once the two decay channels $\gamma_{abs}$ and $\gamma_{rad}$ are balanced and maximized within the tri-layer (or quad-layer) structural color assembly. Both theoretical and experimental evidence support the prediction from TCM and provide a new design principle for high chromatic structural color production.

In certain variations, as noted above, the present disclosure contemplates forming an assembly having high chromaticity and vivid color generation that defines a resonator cavity comprising a multilayer stack. The designed structures may be fabricated using physical vapor deposition (PVD) or other known deposition techniques.

In various aspects, the present disclosure provides a structural color device 50 that includes a multilayer stack structure 60 that defines an asymmetric resonator cavity having a high chroma such as that shown for example in FIG. 8A. The multilayer stack structure 60 comprises a first layer 62 comprising a light absorbing material (e.g., the absorber or A layer that absorbs light in the visible range) that also serves as a substrate. The multilayer stack structure 60 also includes a second layer 64 that comprises a low refractive index material (e.g., L layer) and a third layer 66 that comprises a high refractive index material (e.g., H layer). In this manner, the multilayer stack structure 60 comprises at least three material layers. As shown in FIG. 8A, an electromagnetic wave 80, such as sunlight or ambient light, is directed towards the structural color device 50. In various aspects, the structural color device 50 is capable of reflecting a portion of the electromagnetic spectrum/electromagnetic wave 80 having a range of predetermined wavelengths to generate a reflected output 86 that may be viewed or observed (e.g., by a human or machine). As shown in FIG. 8A, a first portion 82 of the electromagnetic wave 80 penetrates into the multilayer stack structure 60 where an internally reflected wave 84 may reflect one or more times between the second layer 64 (e.g., L layer) and the third layer 66 (e.g., H layer) in the resonator cavity defined therein.

In one variation, the first layer (e.g., A layer) comprises a light absorbing material that includes any material with absorptive properties of electromagnetic radiation with wavelengths in the visible light range. In certain variations, the light absorbing material may comprise an element selected from the group consisting of elements from Groups 2 to 16, for example, Groups 2, 4, and 13 to 16, or Groups 4 and 13 to 16, of the IUPAC Periodic Table. As referred to herein, "Group" refers to the Group numbers (i.e., columns) of the Periodic Table as defined in the current IUPAC Periodic Table, also known as Groups II to VI. Thus, in certain variations, the light absorbing material may include an element selected from Groups 2, 4, and 13 to 16, or more particularly, Groups 4 and 13 to 16, for example, transition metals selected from Groups IVb (IUPAC Group 4), like titanium (Ti), semiconductors and compounds thereof selected from Periodic Table Groups III to V (IUPAC Groups 13 to 15) of, including Group IV (IUPAC Group 14), such as silicon (Si), germanium (Ge), silicon carbide (SiC), Groups III to V (IUPAC Groups 13 to 15) semiconductor compounds, such as gallium nitride (GaN), gallium phosphide (GaP), Groups II to VI (IUPAC Groups 2 to 16) semiconductor compounds, such as zinc sulfide (ZnS), zinc selenide (ZnSe), other chalcogenides, iron oxides, and combinations thereof. Chalcogenides may include an element from Group VI (IUPAC Group 16) of the Periodic Table, including various sulfides, selenides, tellurides, and the like. In certain variations, the light absorbing material that forms the first layer (e.g., A layer) may be selected from the group consisting of: silicon (Si), germanium (Ge), titanium (Ti), silicon carbide (SiC), gallium nitride (GaN), gallium phosphide (GaP), zinc sulfide (ZnS), zinc selenide (ZnSe), chalcogenides, iron oxides, carbon black, carbon nanotubes (CNTs), colored plastics or polymers, and combinations thereof. Colored plastics or polymers may include polyesters, such as polyethylene terephthalate (PET), polyethylene naphthalate or (poly(ethylene 2,6-naphthalate) (PEN), polycarbonates, polyacrylates and polymethacrylates, including poly(methylmethacrylate) (PMMA), poly(methacrylate), poly(ethylacrylate), siloxanes, like polydimethylsiloxane (PDMS), acrylonitrile butadiene styrene (ABS), and the like including pigments or dyes. In certain variations, the light absorbing material that forms the first layer (e.g., A layer) may be selected from the group consisting of: silicon (Si), germanium (Ge), titanium (Ti), oxides thereof, colored plastics, and combinations thereof.

The second layer 64 (e.g., L layer) comprises at least one low refractive index material, which as described above has a real part of refractive index ($n_L$) that is less than refractive index ($n_H$) of the high refractive index material that forms the third layer 66 (e.g., H layer). The low refractive index ($n_L$) of the second layer 64 (e.g., L layer) may be less than or equal to about 2, while the high refractive index ($n_H$) of the third layer 66 (e.g., H layer) is greater than or equal to about 2. In certain variations, there is a high index contrast between the high refractive index third layer 66 (e.g., H layer) and the adjacent low refractive index second layer 64 (e.g., L layer), for example, a difference in the refractive indices ($n_H-n_L$) of greater than or equal to about 0.5, optionally greater than or equal to about 1, optionally greater than or equal to about 1.5, and in certain aspects, optionally greater than or equal to about 2. Stated in another way, a difference in the refractive indices of the high refractive index third layer 66 (e.g., H layer) and the low refractive index second layer 64 (e.g., L layer) is substantial, for example, the refractive index contrast is at least about a 40% difference between the low refractive index and the high refractive index ($(n_H-n_L)/n_L$), optionally a refractive index contrast between the at least one high refractive index layer and at least one of the two low refractive index layers is greater than or equal to about 60%, optionally greater than or equal to about 80%, optionally greater than or equal to about 100%, optionally at least about a 150% difference, optionally at least about a 150% difference, and in certain aspects, optionally at least about a 200% difference. Thus, the materials selected for the high refractive index third layer 66 (e.g., H layer) and the low refractive index second layer 64 (e.g., L layer) provide such a high refractive index contrast.

In certain aspects, the second layer 64 (e.g., L layer) may be formed of a low refractive index material selected from the group consisting of: semiconductor oxides or nitrides comprising silicon dioxide ($SiO_2$), silicon nitride ($Si_3N_4$), metal oxides and sulfides comprising zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), zinc selenide (ZnSe), zinc sulfide (ZnS), aluminum oxide ($Al_2O_3$), magnesium fluoride ($MgF_2$), polymers, and combinations thereof. In certain variations, the low refractive index material for the second layer 64 (e.g., L layer) may be selected from the group consisting of: silicon dioxide ($SiO_2$), magnesium fluoride ($MgF_2$), and combinations thereof.

The third layer 66 (e.g., H layer) comprises a high refractive index material selected from the group consisting of: semiconductors such as amorphous silicon (a-Si), germanium (Ge); metal oxides or sulfides such as titanium oxide ($TiO_2$), zirconium dioxide ($ZrO_2$), cupric (I) oxide (CuO), hafnium dioxide ($HfO_2$), ferric oxide ($Fe_2O_3$), vanadium pentoxide ($V_2O_5$) zinc oxide (ZnO), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof. In certain aspects, the high refractive index material selected from the group consisting of: titanium oxide ($TiO_2$), zirconium dioxide ($ZrO_2$), cupric (I) oxide (CuO), hafnium dioxide ($HfO_2$), and combinations thereof.

In certain aspects, there is a high index contrast between the at least one high refractive index layer and the adjacent low refractive index layer, for example, a difference in the refractive indices ($n_H-n_L$) of greater than or equal to about 0.5, optionally greater than or equal to about 1, optionally greater than or equal to about 1.5, and in certain aspects, optionally greater than or equal to about 2. Stated in another way, a difference in the refractive indices of the high refractive index layer and the low refractive index layer is substantial, for example, the refractive index contrast is at least about a 40% difference between the low refractive index and the high refractive index ($(n_H-n_L)/n_L$), optionally a refractive index contrast between the at least one high refractive index layer and at least one of the two low refractive index layers is greater than or equal to about 60%, optionally greater than or equal to about 80%, optionally greater than or equal to about 100%, optionally at least about a 150% difference, and in certain aspects, optionally at least about a 200% difference. Thus, the materials selected for the high refractive index layer and the low refractive index layer provide such a high refractive index contrast. In certain variations, the at least one high refractive index layer has a real part of a refractive index of greater than or equal to about 2, optionally greater than or equal to about 3, and optionally greater than or equal to about 4. The at least two low refractive index layers respectively have a real part of the refractive index of less than or equal to about 2.

In various aspects, the layers (first layer 62, second layer 64, and third layer 66) may be one or more thin film layers. For example, the second layer 64 (e.g., L layer) and the third layer 66 (e.g., H layer) may independently have a maximum average thickness of less than or equal to about 500 nm, optionally less than or equal to about 475 nm, optionally less than or equal to about 450 nm, optionally less than or equal to about 425 nm, optionally less than or equal to about 400 nm, optionally less than or equal to about 375 nm, optionally less than or equal to about 350 nm, optionally less than or equal to about 325 nm, optionally less than or equal to about 300 nm, optionally less than or equal to about 275 nm, optionally less than or equal to about 250 nm, optionally less than or equal to about 225 nm, optionally less than or equal to about 200 nm, optionally less than or equal to about 175 nm, optionally less than or equal to about 150 nm, optionally less than or equal to about 125 nm, optionally less than or equal to about 100 nm, optionally less than or equal to about 75 nm, and in certain variations, optionally less than or equal to about 50 nm. In certain variations, each of the second layer 64 (e.g., L layer) and the third layer 66 (e.g., H layer) may respectively have an average thickness of greater than or equal to about 2 nm to less than or equal to about 500 nm, optionally greater than or equal to about 5 nm to less than or equal to about 400 nm, optionally greater than or equal to about 10 nm to less than or equal to about 400 nm, optionally greater than or equal to about 15 nm to less than or equal to about 400 nm, optionally greater than or equal to about 20 nm to less than or equal to about 400 nm, and in certain variations, optionally greater than or equal to about 25 nm to less than or equal to about 400 nm.

The first layer 62 (e.g., A layer) may have a thickness beyond a light penetration depth (e.g., depth at which first portion 82 of electromagnetic wave 80 penetrates into the multilayer stack structure 60). In certain variations, the first layer 62 may have a maximum average thickness of less than or equal to about 500 nm, optionally less than or equal to about 475 nm, optionally less than or equal to about 450 nm, optionally less than or equal to about 425 nm, optionally less than or equal to about 400 nm, optionally less than or equal to about 375 nm, optionally less than or equal to about 350 nm, optionally less than or equal to about 325 nm, optionally less than or equal to about 300 nm, optionally less than or equal to about 275 nm, optionally less than or equal to about 250 nm, optionally less than or equal to about 225 nm, optionally less than or equal to about 200 nm, optionally less than or equal to about 175 nm, optionally less than or equal to about 150 nm, optionally less than or equal to about 125 nm, optionally less than or equal to about 100 nm, optionally less than or equal to about 75 nm, optionally less than or equal to about 50 nm, and in certain variations, optionally less than or equal to about 25 nm. In certain variations, the first layer 62 (e.g., A layer) has an average thickness of greater than or equal to about 2 nm to less than or equal to about 500 nm, optionally greater than or equal to about 5 nm to less than or equal to about 400 nm, optionally greater than or equal to about 10 nm to less than or equal to about 300 nm, optionally greater than or equal to about 10 nm to less than or equal to about 200 nm, optionally greater than or equal to about 10 nm to less than or equal to about 100 nm, optionally greater than or equal to about 10 nm to less than or equal to about 50 nm, optionally greater than or equal to about 10 nm to less than or equal to about 40 nm, optionally greater than or equal to about 10 nm to less than or equal to about 30 nm, and in certain variations, optionally greater than or equal to about 10 nm to less than or equal to about 25 nm.

In certain aspects, light reflected from the structural color device 50 exhibits a peak range of wavelengths as an output 86 corresponding to a hue or desired color. In the visible range of electromagnetic radiation, wavelengths in a range of about 625 nm to 740 nm are red; orange is at about 590 nm to about 625 nm; yellow is at about 565 nm to about 590 nm; green is at about 520 nm to about 565 nm; blue or cyan is at about 500 nm to about 520 nm; blue or indigo is at about 435 nm to about 500 nm; and violet is at about 380 nm to about 435 nm. Notably, as used herein, blue may encompass blue/cyan, blue/indigo, and violet. In certain aspects, the output 86 of electromagnetic radiation can have a wavelength in a range of greater than or equal to about 625 nm to less than or equal to about 740 nm for red; a range of greater than or equal to about 520 nm to less than or equal to about 565 nm for green; a range of greater than or equal to about 500 nm to less than or equal to about 520 nm for blue or cyan, and a range of greater than or equal to about 435 nm to less than or equal to about 500 nm for blue or indigo. Further, in certain aspects, the light outputted from structural color device 50 may be extra-spectral or a mixture of several different wavelengths. For example, magenta is an extra-spectral mixture of red (625 nm to 740 nm) and blue (435 nm to 500 nm) wavelengths. In certain aspects, the output 86 may appear white (reflecting all colors) or black (absorbing substantially all colors in the visible spectrum). The external surface of the structural color device 50 may be opaque to an observer.

In accordance with certain aspects of the present disclosure, the structural color device 50 may exhibit a relatively high chromaticity or chroma, as defined above as "C" where $C=\sqrt{a^{*2}+b^{*2}}$, where a* and b* are the coordinates in the CIE L*a*b* diagram characterizing the hue level along the red-green and yellow-blue directions/axes. The structural color device 50 may have a chromaticity "C" of greater than or equal to about 90, optionally greater than or equal to about 95, optionally greater than or equal to about 100, optionally greater than or equal to about 105, and in certain variations, optionally greater than or equal to about 110.

In other aspects, the structural color device 50 may have a decay rate of intrinsic resonator absorption ($\gamma_{abs}$) in the resonator cavity and a decay rate of radiative loss or external leakage ($\gamma_{rad}$) of the resonator cavity that are selected to be as close to perfect absorption where a perfect absorption (i.e., unity absorption) can be achieved at resonance ($\omega-\omega_0$) when $\gamma_{abs}=\gamma_{rad}$, which is typically referred to as the critical coupling condition. Thus, the design of the structural color device 50 may strive to achieve a ratio of $\gamma_{abs}/\gamma_{rad}$ of as close to 1 as possible. In certain aspects, a difference of the decay rate of intrinsic resonator absorption ($\gamma_{abs}$) and the decay rate of radiative loss or external leakage ($\gamma_{rad}$) of the resonator cavity defined by the multilayer stack structure 60 of the structural color device 50

$$\left(\Delta(\%) = \frac{\gamma_{abs} - \gamma_{rad}}{\gamma_{abs}}\right)$$

may be less than or equal to about 25% in the decay rates, optionally a difference in the decay rates may be less than or equal to about 20%, optionally less than or equal to about 15%, optionally less than or equal to about 10%, optionally less than or equal to about 5%, optionally less than or equal to about 4%, optionally less than or equal to about 3%, optionally less than or equal to about 2%, and in certain variations, a difference in the decay rate of intrinsic resonator absorption ($\gamma_{abs}$) and the decay rate of radiative loss or external leakage ($\gamma_{rad}$) is optionally less than or equal to about 1%. In addition to minimizing the difference between $\gamma_{rad}$ and $\gamma_{abs}$, the materials selected to form the multilayer stack structure 60 of the structural color device 50 maximize a sum of $\gamma_{abs}$ and $\gamma_{rad}$ to generate a higher chroma color device.

In one variation, a structural color device 50 having high chromaticity and vivid color generation may include a resonator cavity defined by the multilayer stack structure 60 having the first layer 62 (e.g., A layer) comprising a substrate of silicon (Si) (e.g., a wafer having a thickness of about 0.5 mm) over which the low index second layer 64 (e.g., L layer) is disposed. In this variation, silicon serves as a substrate and absorber and is sufficiently thick to block any light transmission. In certain variations, a 0.5 mm silicon (Si) wafer is used, but in practice a silicon with a thickness of several microns is sufficient for the structure. The low index second layer 64 (e.g., L layer) is adjacent to and in contact with the first layer 62 (e.g., A layer) and may be formed of a low refractive index silicon dioxide ($SiO_2$) having a thickness of about 225 nm. Adjacent to and in contact with the second layer 64 (e.g., L layer) is third layer 66 (e.g., H layer) that may be formed of high refractive index titanium dioxide ($TiO_2$) having a thickness of about 25 nm. This structural color device 50 has a chromaticity "C" of about 93.4.

In another variation, a structural color device 50 having high chromaticity and vivid color generation may include a resonator cavity defined by the multilayer stack structure 60 having the first layer 62 (e.g., A layer) comprising titanium (Ti), titanium dioxide ($TiO_2$), and/or both Ti and $TiO_2$. For example, the first layer 62 (e.g., A layer) may include a first sublayer of $TiO_2$ at a thickness of 24 nm disposed or deposited on a second sublayer of metal (e.g., titanium) to form a multilayer absorber (first layer 62). Notably, the metal sublayer (Ti) does not have a specific thickness so long as it is optically thick, by way of example, having a thickness of about 100 nm. The low index second layer 64 (e.g., L layer) is adjacent to and in contact with the first layer 62 (e.g., A layer) and may be formed of a low refractive index silicon dioxide ($SiO_2$) having a thickness of about 170 nm. Adjacent to and in contact with the second layer 64 (e.g., L layer) is third layer 66 (e.g., H layer) that may be formed of high refractive index titanium dioxide ($TiO_2$) having a thickness of about 25 nm. This structural color device 50 has a chromaticity "C" of about 95.0.

In yet another variation, a structural color device 50 having high chromaticity and vivid color generation may include a resonator cavity defined by the multilayer stack structure 60 having the first layer 62 (e.g., A layer) comprising germanium (Ge), aluminum (Al), and/or both Ge and Al. For example, a first sublayer of Ge at a thickness of 14 nm may be disposed on a second sublayer of aluminum metal to form a multilayer absorber (first layer 62). Notably, the metal (Al) does not have a specific thickness so long as it is optically thick, by way of example, having a thickness of about 100 nm. The low index second layer 64 (e.g., L layer) is adjacent to and in contact with the first layer 62 (e.g., A layer) and may be formed of a low refractive index silicon dioxide ($SiO_2$) having a thickness of about 205 nm. Adjacent to and in contact with the second layer 64 (e.g., L layer) is third layer 66 (e.g., H layer) that may be formed of high refractive index titanium dioxide ($TiO_2$) having a thickness of about 25 nm. This structural color device 50 has a chromaticity "C" of about 110.2.

In further variations, the present disclosure provides a structural color device 50A shown in FIG. 8B that includes a multilayer stack structure 60A that defines an asymmetric resonator cavity having a high chroma. The structural color device 50A with multilayer stack structure 60A is similar to that of the structural color device 50 with multilayer stack structure 60 in FIG. 8A, but further comprises an additional layer to form a four-layer stack. To the extent that the components and their properties are the same as those in FIG. 8A they will not be discussed again for brevity, but it will be understood that the discussion above in the context of FIG. 8A is applicable here. An ultrathin fourth layer 68 is disposed between the first layer 62 (e.g., A layer) and second layer 64 (e.g., L layer). The ultrathin fourth layer 68 may be formed of a high refractive index material like those dielectric materials described above as being suitable in for the third layer 66 (e.g., H layer). An inclusion of an ultrathin high index dielectric as the ultrathin fourth layer 68 on top of the lossy bottom layer (first layer 62 (e.g., A layer)) can further boost the cavity absorptive decay rate, which helps to finetune the color chroma.

In certain aspects, a choice of the ultrathin high refractive index material for the ultrathin fourth layer 68 minimizes a difference of the following two quantities:

$$n_0^2$$

(i.e., a refractive index of the ultrathin high index material of the ultrathin fourth layer 68 squared) and $n^2+\kappa^2$ (i.e., a sum of the real and imaginary part of the absorber material forming the first layer 62 (e.g., A layer).

In certain aspects, the ultrathin fourth layer 68 has an ultrathin thickness meaning that it has a thickness of less than or equal to about 30 nm, optionally less than or equal to about 25 nm, optionally less than or equal to about 20 nm, and in certain aspects, optionally less than or equal to about 15 nm. For example, the ultrathin fourth layer 68 may have a thickness of greater than or equal to about 2 nm to less than or equal to about 30 nm and optionally greater than or equal to about 5 nm to less than or equal to about 25 nm.

The present disclosure provides a new way of understanding the spectra behavior of a Fabry-Pérot type tri-layer and quad-layer stacks for subtractive structural color based on a temporal coupled mode analysis. This cavity-based analysis is able to fit the reflection spectra feature and predict the color chromaticity well even without taking the material dispersion into account. To produce the highest chromatic color, the analysis reveals that a matching of the absorptive and radiative decay rates while both being maximized can lead to a broad and highest absorption peak. An inclusion of an ultrathin high index dielectric on top of the lossy bottom layer can further boost the cavity absorptive decay rate, which helps to finetune the color chroma. Both simulation and experimental results are presented in accordance with color chromaticity predicted by the temporal coupled mode analysis.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A structural color device having high chromaticity and vivid color generation, the device comprising:

a resonator cavity comprising a multilayer stack including:

a first layer comprising a light absorbing material;

a second layer comprising a low refractive index material defining a first side and a second side, wherein the first side faces the first layer; and a third layer comprising a high refractive index material, wherein the third layer is disposed on the second side of the second layer, wherein the structural color device has one or more of: (i) a chromaticity "C" of greater than or equal to about 90; (ii) a difference of a decay rate of intrinsic resonator absorption ($\gamma_{abs}$) of the resonator cavity and a decay rate of radiative loss ($\gamma_{rad}$) of the resonator cavity is less than or equal to about 25%; or both (i) and (ii).

2. The structural color device of claim 1, wherein the light absorbing material of the first layer is selected from the group consisting of: silicon (Si), germanium (Ge), titanium (Ti), silicon carbide (SiC), gallium nitride (GaN), gallium phosphide (GaP), zinc sulfide (ZnS), zinc selenide (ZnSe), chalcogenides, iron oxides, carbon black, carbon nanotubes (CNTs), colored polymers, and combinations thereof.

3. The structural color device of claim 1, wherein the low refractive index material of the second layer is selected from the group consisting of: silicon dioxide ($SiO_2$), silicon nitride ($Si_3N_4$), zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), zinc selenide (ZnSe), zinc sulfide (ZnS), aluminum oxide ($Al_2O_3$), magnesium fluoride ($MgF_2$), polymers, and combinations thereof.

4. The structural color device of claim 1, wherein the low refractive index material of the second layer has a real part of a refractive index of less than or equal to about 2.

5. The structural color device of claim 1, wherein the high refractive index material of the third layer is selected from the group consisting of: titanium oxide ($TiO_2$), zirconium dioxide ($ZrO_2$), cupric (I) oxide (CuO), hafnium dioxide ($HfO_2$), amorphous silicon (a-Si), germanium (Ge), ferric oxide ($Fe_2O_3$), vanadium pentoxide ($V_2O_5$) zinc oxide (ZnO), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof.

6. The structural color device of claim 1, wherein the high refractive index material of the third layer has a real part of a refractive index of greater than or equal to about 2.

7. The structural color device of claim 1, wherein the first layer, the second layer, and the third layer respectively have a maximum average thickness of less than or equal to about 500 nm.

8. The structural color device of claim 1, wherein the first layer has a maximum average thickness of less than or equal to about 50 nm.

9. The structural color device of claim 1, wherein the second layer comprises silicon dioxide ($SiO_2$) and the third layer comprises titanium dioxide ($TiO_2$).

10. The structural color device of claim 1, wherein the first layer comprises silicon (Si), the second layer comprises silicon dioxide ($SiO_2$) and has a second thickness of about 225 nm, and the third layer comprises titanium dioxide ($TiO_2$) and has a third thickness of about 25 nm and the chromaticity "C" is about 93.4.

11. The structural color device of claim 1, wherein the first layer comprises a first sublayer comprising titanium dioxide ($TiO_2$) having a first thickness of about 24 nm disposed over a second sublayer comprising titanium (Ti), the second layer comprises silicon dioxide ($SiO_2$) and has a second thickness of about 225 nm, and the third layer comprises titanium dioxide ($TiO_2$) and has a third thickness of about 25 nm and the chromaticity "C" is about 95.

12. The structural color device of claim 1, wherein the first layer comprises a first sublayer comprising germanium (Ge) having a first thickness of about 14 nm disposed over a second sublayer comprising aluminum (Al), the second layer comprises silicon dioxide ($SiO_2$) and has a second thickness of about 205 nm, and the third layer comprises titanium dioxide ($TiO_2$) and has a third thickness of about 25 nm and the chromaticity "C" is about 110.2.

13. The structural color device of claim 1, further comprising a fourth layer disposed between the first layer and the second layer, wherein the fourth layer has a maximum average thickness of less than or equal to about 30 nm and comprises a high refractive index material.

14. A structural color device having high chromaticity and vivid color generation, the device comprising:

a resonator cavity comprising a multilayer stack including:

a first layer comprising a light absorbing material selected from the group consisting of: silicon (Si), germanium (Ge), titanium (Ti), silicon carbide (SiC), gallium nitride (GaN), gallium phosphide (GaP), zinc sulfide (ZnS), zinc selenide (ZnSe), chalcogenides, iron oxides, carbon black, carbon nanotubes (CNTs), colored plastics, and combinations thereof;

a second layer comprising a low refractive index material selected from the group consisting of: silicon dioxide ($SiO_2$), silicon nitride ($Si_3N_4$), zinc oxide (ZnO), hafnium oxide ($HfO_2$), molybdenum trioxide ($MoO_3$), tantalum pentoxide ($Ta_2O_5$), niobium pentoxide ($Nb_2O_5$), oxide tungsten trioxide ($WO_3$), zinc selenide (ZnSe), zinc sulfide (ZnS), aluminum oxide ($Al_2O_3$), magnesium fluoride ($MgF_2$), polymers, and combinations thereof defining a first side and a second side, wherein the first side faces the first layer; and a third layer comprising a high refractive index material selected from the group consisting of: titanium oxide ($TiO_2$), zirconium dioxide ($ZrO_2$), cupric (I) oxide (CuO), hafnium dioxide ($HfO_2$), amorphous silicon (a-Si), germanium (Ge), ferric oxide ($Fe_2O_3$), vanadium pentoxide ($V_2O_5$) zinc oxide (ZnO), molybdenum trioxide ($MoO_3$), tantalum pentoxide ($Ta_2O_5$), niobium pentoxide ($Nb_2O_5$), tungsten trioxide ($WO_3$), zinc selenide (ZnSe), zinc sulfide (ZnS), and combinations thereof, wherein the third layer is disposed on the second side of the second layer, wherein the structural color device has one or more of: (i) a chromaticity "C" of greater than or equal to about 90; (ii) a difference of a decay rate of intrinsic resonator absorption ($\gamma_{abs}$) of the resonator cavity and a decay rate of radiative loss ($\gamma_{rad}$) of the resonator cavity is less than or equal to about 25%; or both (i) and (ii).

15. The structural color device of claim 14, further comprising a fourth layer disposed between the first layer and the second layer, wherein the fourth layer has a maximum average thickness of less than or equal to about 30 nm and comprises a high refractive index material.

16. The structural color device of claim 14, wherein the first layer, the second layer, and the third layer respectively have a maximum average thickness of less than or equal to about 500 nm.

17. The structural color device of claim 14, wherein the first layer has a maximum average thickness of less than or equal to about 50 nm.

* * * * *